United States Patent
Miuchi et al.

(10) Patent No.: US 10,023,745 B2
(45) Date of Patent: Jul. 17, 2018

(54) TURMERIC PIGMENT COMPOSITION AND METHOD FOR PREPARING SAME

(75) Inventors: Takeshi Miuchi, Toyonaka (JP); Masayuki Nishino, Toyonaka (JP); Yasushi Sasaki, Toyonaka (JP); Takashi Morimoto, Toyonaka (JP); Yoshiharu Tanaka, Toyonaka (JP)

(73) Assignee: SAN-EI GEN F.F.I., INC., Toyonaka-shi (JP)

( * ) Notice: Subject to any disclaimer, the term of this patent is extended or adjusted under 35 U.S.C. 154(b) by 0 days.

(21) Appl. No.: 13/497,586

(22) PCT Filed: Sep. 28, 2009

(86) PCT No.: PCT/JP2009/066823
§ 371 (c)(1),
(2), (4) Date: Mar. 22, 2012

(87) PCT Pub. No.: WO2011/036811
PCT Pub. Date: Mar. 31, 2011

(65) Prior Publication Data
US 2012/0195949 A1 Aug. 2, 2012

(51) Int. Cl.
*A61K 8/02* (2006.01)
*A23L 1/275* (2006.01)
*C08K 11/00* (2006.01)
*C09B 61/00* (2006.01)
*A23L 29/25* (2016.01)
*A23L 5/43* (2016.01)

(52) U.S. Cl.
CPC .............. *C09B 61/00* (2013.01); *A23L 5/43* (2016.08); *A23L 29/25* (2016.08)

(58) Field of Classification Search
None
See application file for complete search history.

(56) References Cited

U.S. PATENT DOCUMENTS 4,705,691 A * 11/1987 Kupper et al. ............... 426/590
4,999,205 A 3/1991 Todd, Jr.
5,460,823 A * 10/1995 Jensen et al. ............... 424/451
(Continued)

FOREIGN PATENT DOCUMENTS

CN 1302559 A 7/2001
EP 1 103 266 A2 11/2000
(Continued)

OTHER PUBLICATIONS

Tramslation of JP2002-187837, 2012.*
(Continued)

*Primary Examiner* — Jianfeng Song
(74) *Attorney, Agent, or Firm* — Kratz, Quintos & Hanson, LLP

(57) ABSTRACT

[Object]
The present invention relates to a turmeric pigment composition. More specifically, the present invention provides a turmeric pigment composition in which aggregation and sedimentation of a turmeric pigment over time is effectively prevented even when a concentrated amount of turmeric pigment is incorporated in a solvent; the turmeric pigment composition also ensures a desirable color-developing property, and is capable of stably adding a deep color with a bright tone, which was never accomplished by a hitherto-known colorant.

6 Claims, 5 Drawing Sheets

(56) References Cited

U.S. PATENT DOCUMENTS

| | | | |
|---|---|---|---|
| 6,190,686 | B1 | 2/2001 | Isager et al. |
| 6,500,473 | B1 | 12/2002 | Koehler et al. |
| 2003/0041780 | A1 | 3/2003 | Isager et al. |
| 2006/0024242 | A1 | 2/2006 | Oshiro |
| 2006/0118000 | A1 | 6/2006 | Isager et al. |
| 2008/0175875 | A1* | 7/2008 | Sunkara .................. 424/401 |
| 2009/0280199 | A1* | 11/2009 | Russell .................. 424/732 |

FOREIGN PATENT DOCUMENTS

| | | |
|---|---|---|
| JP | 54-163866 | 12/1979 |
| JP | 59-125867 | 7/1984 |
| JP | 03-097761 | 4/1991 |
| JP | 7-101882 | 4/1995 |
| JP | 2000-504216 | 4/2000 |
| JP | 2000-504516 | 4/2000 |
| JP | 2001-206844 | 7/2001 |
| JP | 2002-187837 A1 | 7/2002 |
| JP | 2003-500035 A1 | 1/2003 |
| JP | 2005-41817 | 2/2005 |
| JP | 2005-185237 | 7/2005 |
| JP | 2005-328839 | 12/2005 |
| JP | 2008-92806 A1 | 4/2008 |
| JP | 2008-110934 A1 | 5/2008 |
| JP | 2009-89634 A1 | 4/2009 |
| JP | 2009-201371 A1 | 9/2009 |
| JP | 2009-263638 A1 | 11/2009 |
| WO | WO 91/06292 A1 | 5/1991 |

OTHER PUBLICATIONS

Hanan S. Samaha et al.: "Modulation of Apoptosis by Sulinac, Curcumin, Phenylethyl-3-methylcaffeate, and 6-Phenylhexyl Isothiocyanate: Apoptotic Index as a Biomarker in Colon Cancer Chemoprevention and Promotion", Cancer Research 57, Apr. 1, 1997, pp. 1301-1305.

Mou-Tuan Huang et al.: "Inhibitory Effects of Dietary Curcumin on Forestomach, Duodenal, and Colon Carcinogenesis in Mice", Cancer Research 54, Nov. 15, 1994, pp. 5841-5847.

Sreejayan and M.N.A. Rao: "Curcuminoids as Potent Inhibitors of Lipid Peroxidation", J. Pharm. Pharmacol., 46, Apr. 18, 1994, pp. 1013-1016.

R. C. Srimal et al.: "Pharmacology of diferuloyl methane (curcumin), a non-steroidal anti-inflammatory agent", J. Pharm. Pharmacol., 25, 1973, pp. 447-452.

D. Subba Rao et al.: "Effect of Curcumin on Serum and Liver Cholesterol Levels in the Rat", Journal of Nutrition, 100, 1970, pp. 1307-1316.

P. Suresh Babu et al.: "Hypolipidemic action of curcumin, the active principle of turmeric (*Curcuma longa*) in streptozotocin induced diabetic rats", Molecular and Cellular Biochemistry, 166, 1997, pp. 169-175.

Shingo Yano et al.: "Antiallergic Activity of Curcuma longa (II) Features of inhibitory actions on histamine release from mast cells", Natural Medicines, 54(6), 2000, pp. 325-329.

Pamela Maher et al.: "A pyrazole derivative of curcumin enhances memory", Neurobiology of Aging, 31, Jul. 17, 2008, pp. 706-709.

International Search Report for International Application No. PCT/JP2009/066823 dated Dec. 22, 2009.

Al-Assaf, S., et al., "Characterisation of Gum Ghatti and Comparison with Gum Arabic," Gums and Stabilisers for the Food Industry, No. 14 (2008), pp. 280-290.

* cited by examiner (a)

(b)

(b)

TURMERIC PIGMENT COMPOSITION AND METHOD FOR PREPARING SAME

TECHNICAL FIELD

The present invention relates to a turmeric pigment composition with improved water dispersibility of a sparingly water-soluble turmeric pigment; and a preparation method thereof. More specifically, the present invention relates to a turmeric pigment composition having excellent dispersibility in aqueous solution; and a preparation method thereof. Such a turmeric pigment composition of the present invention having excellent dispersibility in aqueous solution provides an advantageous effect of suppressing aggregation and precipitation of turmeric pigment over time even when a concentrated amount thereof is added to an aqueous solution, thereby enabling stable coloring of an aqueous coloring object (an object to be colored) to desired light to deep tones.

Moreover, the present invention relates to a turmeric pigment composition superior not only in coloring function but also in absorbability into the body, and thereby useful not only as a colorant but also as a health food; and a preparation method thereof.

BACKGROUND ART

Food color is one of the critical factors for appetite stimulation. For example, a vividly colored food with no color change or fading is visually enjoyable; further, the beautiful appearance of the food increases the joy of eating. As such, food color can affect the palatability of food.

In consideration of such importance of food color, food coloring technologies have been drawing attention, with the recent growing market of processed food and preserved food. Food coloring agents include natural colorants derived from plant rhizome or fruits, and artificial colorants such as tar dye. Recently, people tend to prefer natural colorants with more natural tones.

Among conventionally known natural colorants is curcuminoid obtained from *Curcuma longa* L., which is a plant of the family Zingiberaceae. Curcuminoid is a general name for compounds including curcumin and an analog thereof, i.e., demethoxy curcumin and bis demethoxy curcumin, and is also a kind of polyphenol. Here, "curcuminoid" is a general name of linear diarylheptanoids such as curcumin, demethoxy curcumin, bisdemethoxy curcumin, yakuchinone A, yakuchinone B, tetrahydrocurcumin, or dihydroxy tetrahydrocurcumin, as well as the salts and esters of these linear diarylheptanoids and analog compounds of other linear diarylheptanoids, such as cassumunins A, B, and C, which are called curcumin polymers.

Curcuminoids have a yellow color, which is particularly vivid among natural yellow colors. Further, curcuminoids also have advantages including excellent heat resistance, oxidation resistance, and reduction resistance; and superior dying power with respect to animal and plant-derived substances. Curcuminoids can be used in, for example, curry powder, takuan pickles (yellow pickled radish), and mustards.

However, curcuminoids have a drawback in that although they are soluble in hot water, ethanol, propyleneglycol, and glacial acetic acid, they are poorly soluble in water (cold water or water at room temperature). Therefore, it is difficult to add yellow color to an aqueous substance using powdered curcuminoid.

In view of this problem, an aqueous turmeric pigment preparation was developed to enable coloring of an aqueous substance with a turmeric pigment, and a method using this pigment preparation was suggested (Patent Document 1). The aqueous turmeric pigment preparation is a so-called alcohol-soluble solution (hydroalcoholic extract solution) obtained by subjecting turmeric powder, which is prepared by pulverizing curcuma dried rhizome, to extraction using hydrous alcohol, and removing a residue (insoluble matter) by solid-liquid separation. Although the extract solution has an advantage in that curcuminoids are dissolved in a solution containing alcohol at a high color value, it suffers some drawbacks; e.g., the danger in the preparation step using flammable alcohol, the insoluble curcuma residues (waste substance) produced in the preparation step, and the particular taste and smell of the resulting extract solution that are derived from the bitter taste and pungent component of turmeric powder. This limits the use of the extract solution as a food colorant. Moreover, there is another drawback in that, when this extract solution is added to water so as to decrease the alcohol concentration, curcuminoids are precipitated over time; consequently, curcuminoids are insolubilized and settled out.

As another method of preparing a water-soluble curcuminoid pigment preparation, Patent Document 2 discloses a method of dispersing in water an alcoholic solution in which a refractory element material such as curcumin or tetrahydrocurcumin is dissolved, thereby first making fine particles of the refractory element material and then combining the obtained particles with an emulsifier (glycerin fatty acid esters, sucrose fatty acid esters, sorbitan fatty acid esters, propylene glycol fatty acid esters, polyoxyethylene sorbitan fatty acid esters, stearin lactic acid calcium, lecithins, cyclodextrin, and the like), thus obtaining a translucent solubilized liquid that is stable for a long period of time. Further, Patent Document 3 discloses a method of dissolving curcumin in hot water or alkaline aqueous solution, removing insoluble residues, and making the pigment finer by dyeing a fine cellulose substance with the resulting solution-form curcumin; thereby preparing a yellow food colorant composition that can easily be dispersed in a pasty aqueous substance or an oily substance, and thereby adding a vivid yellow color to the substance. Additionally, Patent Document 4 discloses a method for preparing a water-soluble transparent curcumin complex with improved light stability and coloring ability, the method comprising contacting curcumin with a substrate selected from a water-soluble branched-chain or cyclic polysaccharide and a water-soluble or water-dispersible protein in an alkaline aqueous solution at a pH of 9 or more, and then acidifying it to a pH of 8 or less. Patent Document 5 further discloses a method for preparing a curcumin-gelatin complex (water-soluble curcumin preparation) by dissolving gelatin and curcumin of 15 wt % at maximum in a solvent containing specific amounts of water and acetic acid, thereby preparing a curcumin-gelatin complex that can be dissolved in water without an artificial emulsifier and that is capable of making a transparent yellow solution.

On the other hand, in addition to the usages as a coloring agent or a dye, curcuminoids have also long been used as a choleretic drug. Further, recent studies found useful physiological activity of curcuminoids, including tumorigenesis inhibitory activity, antioxidant action, antiinflammatory effect, hypocholesterolemic activity, antiallergic action, and encephalopathy prevention activity. Thus, curcuminoids are expected to be applied to medicinal products, cosmetics, dietary supplements and the like (Patent Document 6, Non-Patent Documents 1 to 8).

However, as described above, curcuminoids are sparingly water-soluble; therefore, only a small portion thereof will be absorbed into the body upon oral administration. Thus, the aforementioned useful physiological activities of curcuminoids cannot be fully exhibited in the body. In view of this problem, Patent Document 6 suggests using water-soluble curcuminoid glycosides instead of the sparingly water-soluble curcuminoid, so as to improve the absorbability of curcumin into the body and sufficiently exhibit the superior medicinal effect of curcumin in vivo.

As explained above, the techniques disclosed in Patent Documents 1 to 6 are all directed to solubilization of turmeric pigment in water. However, the solubilization of turmeric pigment in water is actually limited, as it is saturated at a certain concentration. When the concentration reaches this point, any attempt to dissolve more turmeric pigment will result in the generation of aggregation and sedimentation of the turmeric pigment. As such, it is difficult to actually incorporate a turmeric pigment in an amount larger than the allowable content.

PRIOR ART DOCUMENTS

Patent Documents

[Patent Document 1] Comparative Production Example 1 of Japanese Unexamined Patent Publication No. 2005-185237
[Patent Document 2] Japanese Unexamined Patent Publication No. 2005-328839
[Patent Document 3] Japanese Unexamined Patent Publication No. S54-163866
[Patent Document 4] Japanese Unexamined Patent Publication No. H03-97761
[Patent Document 5] Japanese Unexamined Patent Publication No. S59-125867
[Patent Document 6] Japanese Unexamined Patent Publication No. 2005-41817

Non-Patent Documents

[Non-Patent Document 1] Samaha H S, Kelloff G J, Steele V, Rao C V, Reddy B S., Cancer Res., 57, 1301-5 (1997).
[Non-Patent Document 2] Huang M T, Lou Y R, Ma W, Newmark H L, Reuhl K R, Conney A H., Cancer Res., 54, 5841-47 (1994).
[Non-Patent Document 3] Sreejayan, Rao M N., J Pharm Pharmacol., 46, 1013-6 (1994).
[Non-Patent Document 4] Srimal R C, Dhawan B N., J Pharm Pharmacol., 25, 447-52 (1973).
[Non-Patent Document 5] Rao D S, Sekhara N C, Satyanarayana M N, Srinivasan M., J. Nutr., 100, 1307-16 (1970).
[Non-Patent Document 6] Babu P S, Srinivasan K., Mol Cell Biochem., 166, 169-75 (1997).
[Non-Patent Document 7] Yano S, Terai M, Shimizu K L, Futagami Y, Horie S., Natural Medicines, 54, 325-9 (2000).
[Non-Patent Document 8] Maher P, Akaishi T, Schubert D, Abe K., Neurobiol Aging, July 16. [Epub ahead of print] (2008).

SUMMARY OF INVENTION

Technical Problem

The present invention was made in view of the aforementioned problems, and provides a turmeric pigment composition and a preparation method thereof. The turmeric pigment composition of the present invention is a turmeric pigment liquid composition and a dried product thereof (hereinafter, they are both referred to as a "turmeric pigment composition") in which a concentrated amount of turmeric pigment is stably dispersed in a hydrous solution, while effectively suppressing aggregation and sedimentation of the turmeric pigment over time using a technology different from that of the hitherto-known method. The thus-obtained turmeric pigment composition of the present invention exerts superior dispersibility and dispersion stability with respect to an aqueous coloring substance (object to be colored), and ensures a superior coloring ability (color developing property) and coloring stability.

Further, another object of the present invention is to provide a turmeric pigment composition that has superior absorbability into the body, and that is useful for functional foods or the like; and a preparation method thereof.

Additionally, still another object of the present invention is to provide a method of stably dispersing a concentrated amount of a sparingly water-soluble turmeric pigment in a hydrous solution.

Solution to Problem

The inventors of the present invention conducted extensive research to solve the above problems of hitherto-known technologies, and found that a crystalline turmeric pigment can be rendered into fine particles having an average particle diameter (median diameter) of 1 μm or below by adding a crystalline turmeric pigment to a hydrous solution of gum ghatti, and pulverizing the crystal in the gum ghatti solution; that the turmeric pigment composition thus obtained contains insoluble turmeric pigment stably dispersed in the solvent, and that no precipitation is therefore generated due to saturation, unlike in the hitherto-known solubilization technology; and that, in this method, the aggregation and sedimentation of turmeric pigment over time was actually effectively prevented, even when a concentrated amount of a turmeric pigment was added to a hydrous solution. Further, the inventors confirmed that the turmeric pigment composition has an excellent color-developing property due to its superior dispersibility and dispersion stability with respect to aqueous solutions and other aqueous substances, and therefore is capable of stably coloring an object to desired light to deep tones.

Moreover, the inventors further found that the turmeric pigment composition has a significantly improved absorbability into the body upon oral administration; and that therefore, the turmeric pigment composition of the present invention prepared in the above method is useful as a functional food. Based on these findings, the inventors completed the present invention.

The present invention encompasses the following turmeric pigment compositions and manufacturing methods thereof;

(I) Turmeric Pigment Composition (I-1) A turmeric pigment composition comprising gum ghatti and a turmeric pigment having an average particle diameter of 1 μm or below.

(I-2) The turmeric pigment composition according to (I-1), wherein the turmeric pigment composition has a liquid form and comprises gum ghatti, a turmeric pigment having an average particle diameter of 1 μm or below, and water.

(I-3) The turmeric pigment composition according to (I-1), wherein the turmeric pigment composition has a powder, granular or tablet form that is prepared by a step of subjecting the turmeric pigment composition according to (I-1) to dry powderization.

(II) Method for Preparing a Turmeric Pigment Composition (II-1) A method for preparing a turmeric pigment liquid composition, comprising the step of: adding a turmeric pigment to a gum ghatti hydrous solution, and pulverizing the turmeric pigment in the solution until an average particle diameter of the turmeric pigment falls to 1 µm or below.

(II-2) The method for preparing a turmeric pigment composition, according to claim (II-1), wherein the turmeric pigment to be added to a gum ghatti hydrous solution is a crystalline turmeric pigment.

(II-3) A method for preparing a turmeric pigment composition having a powder, granular or tablet form, comprising the step of subjecting a turmeric pigment liquid composition resulting from the method of (II-1) or (II-2) to dry powderization.

(II-4) The method for preparing a turmeric pigment composition according to any one of (II-1) to (II-3), wherein the method is performed to prepare a turmeric pigment composition with improved absorbability into the body upon oral administration or oral intake.

(III) Application of Turmeric Pigment Composition (III-1) A food or a cosmetic comprising the turmeric pigment composition according to any one of (I-1) to (I-3), or a turmeric pigment composition prepared by the method according to any one of (II-1) to (II-4).

(III-2) Use of the turmeric pigment composition according to any one of (I-1) to (I-3), or a turmeric pigment composition prepared by the method according to any one of (II-1) to (II-4), for the manufacture of a food with improved absorbability of turmeric pigment into the body.

(IV) Method for Stabilizing Dispersion of Turmeric Pigment in Aqueous Solution (IV-1) A method for stabilizing dispersion of a turmeric pigment in a hydrous solution, comprising adding a turmeric pigment to a gum ghatti hydrous solution, and pulverizing the turmeric pigment in the solution until an average particle diameter of the turmeric pigment falls to 1 µm or below.

(IV-2) The method for stabilizing dispersion of a turmeric pigment in a hydrous solution according to (IV-1), wherein the turmeric pigment to be added to a gum ghatti hydrous solution is a crystalline turmeric pigment.

(V) A Method for Improving Absorbability of Turmeric Pigment into Body Upon Oral Administration (V-1) A method for improving absorbability of a turmeric pigment into the body upon oral administration, comprising forming a formulation of the turmeric pigment that is a mixture of gum ghatti and a particulate turmeric pigment having an average particle diameter of 1 µm or below.

(V-2) The method according to (V-1), wherein the mixture is prepared by a step of adding a turmeric pigment to a gum ghatti hydrous solution, and pulverizing the turmeric pigment in the solution until an average particle diameter of the turmeric pigment falls to 1 µm or below.

(V-3) The method according to (V-2), wherein the turmeric pigment to be added to a gum ghatti hydrous solution is a crystalline turmeric pigment.

(V-4) The method according to (V-2), wherein the mixture is subjected to dry powderization after the pulverization step in (V-2).

Advantageous Effects of Invention

The method for preparing a turmeric pigment composition of the present invention provides a turmeric pigment composition in which a concentrated amount of a turmeric pigment is stably dispersed in a hydrous solution, while effectively suppressing the aggregation and sedimentation of the turmeric pigment over time. Further, the method for preparing a turmeric pigment composition of the present invention also provides a turmeric pigment composition that ensures superior absorbability of turmeric pigment (curcuminoid) into the body upon oral administration (oral intake).

The thus-obtained turmeric pigment composition of the present invention is useful as a yellow colorant capable of stably coloring an aqueous product (aqueous food, drink, beverage, syrup, lotion, etc.) to a desired color with a desired tone while ensuring a sufficient color development, and preventing aggregation and sedimentation of the turmeric pigment over time. Moreover, the turmeric pigment composition of the present invention ensures excellent absorbability of curcuminoid into the body upon oral administration, and is therefore also useful as a highly effective functional food due to its superior pharmacological effect.

BRIEF DESCRIPTION OF DRAWINGS

FIG. 2($a$) is an image showing dispersion states of turmeric pigments in Drinks A to D (from left to right in the lower row) viewed from a lateral side, and FIG. 2($b$) is an image showing sedimentation states of turmeric pigments in Drinks E to G (from left to right in the upper row) viewed from the bottom of the beverage container.

FIG. 3($a$) is an image showing a dispersion state of a turmeric pigment viewed from a lateral side, and FIG. 3($b$) is an image showing a sedimentation state of a turmeric pigment viewed from the bottom of the beverage container.

Figure 1:
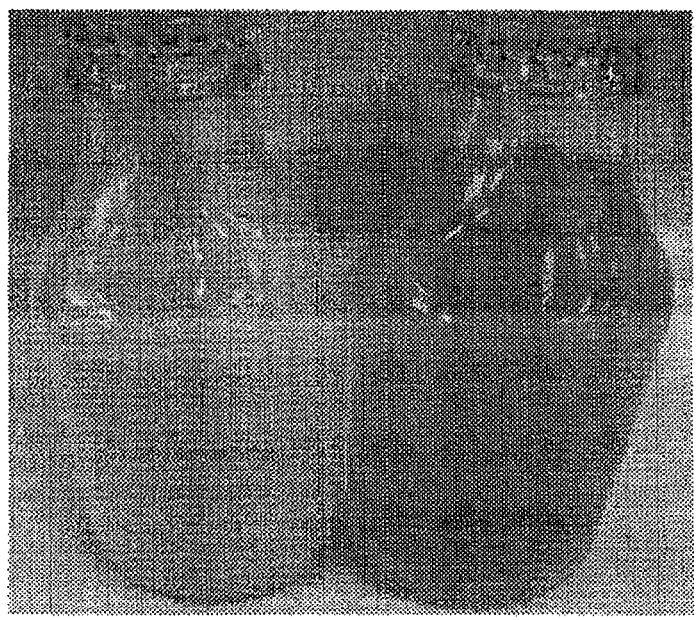
FIG. 1 An image showing an observation result of dispersion state of turmeric pigment in Invention Drink 3 (the left-hand side) and Comparative Drink 7 (the right-hand side) prepared in Experiment 2, on the 7th day of preservation at room temperature.

DESCRIPTION OF EMBODIMENTS (I) Turmeric Pigment Composition and Production Method Thereof The turmeric pigment liquid composition of the present invention (hereinafter may be simply referred to as a "turmeric pigment liquid composition") is characterized by comprising gum ghatti, a turmeric pigment having an average particle diameter of 1 µm or below, and water. As such, the turmeric pigment liquid composition contains water; however, it may also contain a solvent other than water insofar as the composition at least contains water. The solvent may be selected from those compatible with water, and examples thereof include lower alcohols such as ethanol; polyhydric alcohols such as propyleneglycol or glycerin; and sugar solutions such as high fructose corn syrup, sucrose syrup, or isomerized syrup.

The proportion of the solvent to be incorporated with water is not particularly limited insofar as the final solvent obtained by mixing the solvent and water can dissolve gum ghatti, and does not dissolve the turmeric pigment. The turmeric pigment liquid composition preferably contains water in an equal or more amount of gum ghatti. Generally, a solvent may be added as required within this range.

Specifically, the turmeric pigment liquid composition of the present invention is a liquid composition in which a turmeric pigment having an average particle diameter of 1 µm or below is dispersed in a hydrous solution of gum ghatti. It is also possible to prepare a turmeric pigment composition in a powdered state (turmeric pigment powdered composition) by subjecting the turmeric pigment liquid composition to dry powderization by an ordinary method. Further, it is also possible to prepare a granular or tablet-form turmeric pigment composition (turmeric pigment granular composition, turmeric pigment tablet composition) by processing the turmeric pigment powdered composition into granules by an ordinary method. Hereinafter, these various forms of composition may be collectively referred to as "turmeric pigment composition" or "pigment composition."

In the present invention, "turmeric pigment" is a substance containing, as a major ingredient, curcumin obtained from the rhizome of *Curcuma longa* L. of the family Zingiberaceae. Examples of turmeric pigments that can be used as a food additive include turmeric powder, which is obtained by powderizing a dried rhizome of *Curcuma longa* L. of the family Zingiberaceae; crude curcumin or oleoresin (turmeric oleoresin), which is obtained by subjecting the turmeric powder to extraction using an appropriate solvent (for example, ethanol, oil, propyleneglycol, hexane, acetone or the like); and purified curcumin.

Preferably, the "turmeric pigment" is curcumin prepared by subjecting a dried rhizome of *Curcuma longa* (turmeric powder) to extraction using warmed ethanol, heated oil or propyleneglycol, or room temperature to heated hexane or acetone; more preferably, curcumin purified to the extent that the turmeric smell and bitter or spicy taste derived from turmeric powder are reduced or removed. Further more preferably, the "turmeric pigment" used in the present invention is a crystalline curcumin. The curcumin can be prepared by subjecting turmeric powder to extraction using hexane and acetone, filtrating the resulting extract solution, and drying the solution to volatilize the solvent.

It is possible to simply use commercially available turmeric pigment (curcumin powder: crystalline form). The commercial turmeric pigment (curcumin powder) can be purchased from, for example, San-Ei Gen F.F.I., Inc.

The gum ghatti used in the present invention is a gum substance publicly known as a thickening agent (food additive); and contains, as a major ingredient, polysaccharide obtained by drying a secretory fluid of a trunk of *Anogeissus Latifolia* Wall of the Combretaceae family. The gum ghatti used in the present invention is commercially available. For example, "gum ghatti SD" from San-Ei Gen F.F.I., Inc. may be used.

Preferably, the gum ghatti is previously dissolved in a solvent to prepare a gum ghatti solution, and adding and mixing a turmeric pigment therewith. The solvent for dissolving gum ghatti is not particularly limited insofar as it is a food solvent that does not dissolve a turmeric pigment. Preferable examples of solvents include water and mixed solvents of water and solvents compatible with water. Examples of solvents compatible with water include lower alcohols such as ethanol; polyhydric alcohols such as propyleneglycol or glycerin; and sugar solutions such as high fructose corn syrup, sucrose syrup, or isomerized syrup. In this specification, these solvents are collectively referred to as a "hydrous solvent." The gum ghatti solution in which gum ghatti is dissolved in such a solvent is referred to as a "gum ghatti hydrous solution."

The gum ghatti is dissolved in the hydrous solvent (preferably water) so that the final concentration falls to 1 to 20 mass %, preferably 1 to 15 mass %, more preferably 1 to 10 mass %; then, a turmeric pigment is added and mixed with the gum ghatti hydrous solution. The amount of a turmeric pigment to be mixed with the gum ghatti hydrous solution is determined in terms of an appropriate concentration to obtain a turmeric pigment having an average particle diameter of 1 µm or below after the pigment is pulverized into granules; specifically, the amount is typically 1 to 30 mass %, preferably 5 to 20 mass %.

In this case, the content of gum ghatti is preferably 1 to 300 parts by mass, more preferably 1 to 200 parts by mass, further preferably 10 to 100 parts by mass, relative to 100 parts by mass of the turmeric pigment.

The method of mixing the gum ghatti hydrous solution and the turmeric pigment is not particularly limited, and any method that can mix them may be adopted. They may be mixed by any common stirrer. For example, they may be mixed by adding a turmeric pigment to the prepared gum ghatti hydrous solution, and then stirring and mixing them using a propeller or the like.

The mixture obtained by stirring and mixing the gum ghatti hydrous solution and the turmeric pigment is then subjected to pulverization (processing into fine particles). The pulverization (processing into fine particles) is preferably performed by physical pulverization, such as a method using a wet pulverizer capable of pulverizing a turmeric pigment to an average particle diameter (median diameter d50) of 1 µm or below. Examples of wet pulverizers include Ultra Visco Mill and Dyno Mill. Further, other wet pulverizers such as a sand mill or CoBall mill may also be used by, for example, adding beads or the like.

By pulverizing the turmeric pigment in the gum ghatti hydrous solution into fine particles having an average particle diameter (median diameter d50) of 1 µm or below by way of such pulverization, preferably physical pulverization, it is possible to allow the turmeric pigment to be stably dispersed in water. Moreover, it is possible to produce a turmeric pigment composition that ensures stable dispersion of the turmeric pigment in the hydrous solvent while effectively suppressing aggregation and sedimentation of the turmeric pigment over time, even after long-term storage.

The method of the present invention in which the turmeric pigment is pulverized (processed into fine particles) in the gum ghatti hydrous solution after the gum ghatti hydrous solution and the turmeric pigment are mixed is simpler than the method of pulverizing the turmeric pigment, and then mixing the resulting powder with the gum ghatti hydrous solution. Moreover, the method of the present invention is also more advantageous in that it enables a turmeric pigment to be pulverized more stably and evenly to the desired average particle diameter, thereby more effectively exerting the effect of the present invention.

It is preferable that the turmeric pigment is pulverized by the above pulverization method as finely as possible. As described above, the turmeric pigment is preferably pulverized to the extent that the resulting particles have an average particle diameter (median diameter d50) of 1 µm or below, more preferably 0.9 µm or below, further preferably 0.5 µm or below. By being pulverized into powder having the specific average particle diameter or below in the gum ghatti hydrous solution, the effects of the turmeric pigment of the present invention, for example, dispersibility and dispersion stability in the hydrous solution, prevention of aggregation and sedimentation over time, increase in absorbability into the body, etc., are more easily exerted.

The average particle diameter (median diameter) of the turmeric pigment in the turmeric pigment liquid composition of the present invention; in other words, the average particle diameter (median diameter) of the turmeric pigment in the gum ghatti hydrous solution, can be measured using a (wet) laser diffraction particle size analyzer Microtrac MT-3000II (Microtrac, Inc.) (conditions, refraction index: 1.81, measurement range: 0.021 to 2000 µm, particle size distribution: volumetric basis).

The turmeric pigment liquid composition prepared by pulverizing (processing into fine particles) a turmeric pigment in the gum ghatti hydrous solution may be, as necessary, further subjected to homogenization treatment so as to evenly mix the respective components including the pulverized turmeric pigment. The method of homogenization treatment is not particularly limited insofar as the method is capable of evenly dispersing the respective components including the pulverized turmeric pigment. For example, the homogenization treatment may be performed using an emulsification/dispersion device such as a nanomizer, a microfluidizer, a homogenizer, or an ultrasonic disperser. By subjecting turmeric pigment liquid composition to the homogenization treatment, the aggregation of the turmeric pigment powder is loosened, thereby increasing the dispersibility and dispersion stability of the pigment in water.

The thus-prepared turmeric pigment liquid composition of the present invention is electrically stable due to the combined use of the turmeric pigment and the gum ghatti hydrous solution; however, it is also possible to adjust the pH to a desirable value according to the target product to which the turmeric pigment liquid composition is added (for example, the product to be colored). Preferably, the pH is adjusted to 8 or less. Examples of pH value-controlling agents include inorganic acids such as phosphate, sulfuric acid or hydrochloric acid; and organic acids such as citric acid, lactic acid, or malic acid. These acids may be appropriately used according to the type of the target product and the targeted pH value.

The thus-prepared turmeric pigment liquid composition of the present invention has a high value of color value (10%), which is 4500 at maximum, preferably 3000 at maximum.

The color value (10%) may be found by the calculation method according to the Japanese Standards of Food Additives. For example, the color value can be found by diluting the target turmeric pigment liquid composition with ethanol, measuring the absorbency of the ethanol solution at a maximum absorption wavelength (in the vicinity of 425 nm) in the visible region, and then converting the obtained absorbency (in the vicinity of 425 nm) to the absorbency of a 10 w/v % solution based on the dilution rate of the ethanol.

Although the form of the turmeric pigment composition of the present invention is not particularly limited, the thus-obtained liquid composition is one of the typical forms. Such a liquid composition is advantageous in easy redispersion of the turmeric pigment when the composition is incorporated in an aqueous liquid composition, such as a beverage or a lotion.

Furthermore, as necessary, it is possible to prepare a turmeric pigment composition in a powdered form (turmeric pigment powdered composition) by processing the thus-obtained turmeric pigment liquid composition into dry powder. Such a turmeric pigment powdered composition is useful for the preparation of a product containing a significantly concentrated amount of turmeric pigment. The turmeric pigment powdered composition is also advantageous in its applicability to the manufacture of dry foods or tablets by a dry method, and in its high preservability even without a preservative. The dryer used for the processing of the turmeric pigment liquid composition into dry powder is not particularly limited; examples thereof include spray dryers such as a spray dryer or slurry dryer, and freeze-dryers.

Moreover, by further processing the turmeric pigment powdered composition into granules, or further tabletting the turmeric pigment powdered composition, it is possible to prepare a turmeric pigment composition in the form of granules (turmeric pigment granular composition) or in the form of tablets (turmeric pigment tablet composition). The granular or tablet-form turmeric pigment composition may be prepared using any common formulation method with the addition of known additives (excipients, binders, lubricants, disintegrant or the like) generally used in this field. In particular, the turmeric pigment granular composition is advantageous in its rapid disintegration when applied to an aqueous product such as a lotion.

Insofar as the effect of the present invention is not impaired, the turmeric pigment composition may further contain, for example, polysaccharide thickeners, fragrances, colorants, antioxidants, improvement agents for a long shelf-life, preservatives, sugars, etc. By adding them, it is possible to vary the taste, fragrance, or texture of the turmeric pigment composition, thereby providing a turmeric pigment composition with a higher palatability.

(II) Application of Turmeric Pigment Composition (1) Application as a Food Additive and an Addition Agent The turmeric pigment composition of the present invention may be used, for example, as a food additive; more specifically, as a colorant or a fragrance to be incorporated in various food products (including general food (including health food) and dietary supplements) and cosmetics.

The food may have any form, including a liquid form, a semi-solid form, or a solid form. Examples of the food include the following.

Beverages (e.g., carbonated beverages, fruit beverages (including fruit juices, fruit juice-containing soft drinks, fruit juice-containing carbonated beverages, fruit pulp-containing beverages), vegetable beverages, vegetable/fruit beverages, low-alcohol beverages, coffee beverages, powdered beverages, sport drinks, supplement beverages, black tea beverages, green teas, blended teas, etc.); desserts (e.g., custard puddings, milk puddings, fruit juice-containing puddings, jelly, Bavarian cream, etc.); frozen desserts (e.g., ice cream, milk ice cream, fruit juice-containing ice cream, soft ice cream, ice candies, sorbets, etc.); gum (e.g., chewing gum, bubble gum, etc.); chocolates (e.g., marble chocolate and like coating chocolates, strawberry chocolate, blueberry chocolate, melon chocolate, etc.); candies (e.g., hard candies (including bon-bons, butter balls, marbles, etc.) and soft candies (including caramel, nougat, gummy candy, marshmallows etc.), drops, toffee, etc.); other confections (e.g., baked confections such as hard biscuits, cookies, okaki (rice crackers), senbei (rice crackers), etc.); soups (e.g., consommé soups, potage soups, pumpkin soups, etc.); tsukemono (Japanese pickles, e.g., asa-zuke, shoyu-zuke, shio-zuke, miso-zuke, nuka-zuke, kasu-zuke, koji-zuke, su-zuke, karashi-zuke, moromi-zuke, ume-zuke, fukujin-zuke, shiba-zuke, shoga-zuke, umezu-zuke, etc.); jams (e.g., strawberry jam, blueberry jam, marmalade, apple jam, apricot jam, etc.); dairy products (e.g., milk beverages, lactic fermented milk drinks, yogurt, cheese, etc.); oil or fat-containing food products (e.g., butter, margarine, etc.); processed grain foods (e.g., breads, noodles, pasta, etc.); processed fish or animal food products (e.g., ham, sausage, kamaboko, chikuwa, etc.); seasonings (e.g., miso, tare (Japanese-style sauces), sauces, bottled lemon juice, vinegar, mayonnaise, salad dressings, curry roux, etc.); and cooked food products (e.g., tamago-yaki (Japanese omelets), omelets, curry, stew, hamburger patties, croquette, soups, okonomi-yaki (pancakes with vegetables, meat or seafood), gyoza (fried or boiled dumplings), fruit jam, etc.).

Among these, beverages, jams, tsukemono, and liquid seasonings belonging to the sauce category are preferable, and beverages are particularly preferable. For the dietary supplements, syrups, liquids and solutions, drinkable preparations, tablets, pills, powders, granules, and capsules are preferable.

When the turmeric pigment composition of the present invention is used as a food additive (colorant or flavoring agent), the product to be colored or flavored (e.g., foods, beverages, and cosmetics) can be produced by adding the turmeric pigment composition of the present invention as a colorant or a flavoring agent in any step during the manufacture of the product. Except for this step, the product can be produced according to a general method.

In this application, the amount of the turmeric pigment composition is not particularly limited insofar as the composition serves the desired purpose. When the turmeric pigment composition is used for coloring, the amount of the turmeric pigment composition of the present invention is 0.01 mass % at minimum relative to the total mass of the final product. By using the turmeric pigment composition produced by the method of the present invention, it is possible to more stably add a deeper color to the product, compared with the case of using a hitherto-known turmeric pigment (hitherto-known turmeric pigment preparation).

Here, an example of a "hitherto-known turmeric pigment preparation" is a liquid, solubilized turmeric pigment composition obtained by subjecting curcumin powder, which is prepared from a crude material through a production method disclosed in the List of Existing Food Additives (Appendix 1 for Labeling and Specifications under the Food Sanitation Law in Notice No. 56, published May 23, 1996, by the Director-General of the Environmental Health Bureau, Ministry of Health and Welfare), to extraction using hydrous ethanol.

(2) Application as a Functional Component

In expectation of the bioactive function of curcumin, the turmeric pigment composition of the present invention can, by itself, be used as a dietary supplement.

In this application, the turmeric pigment composition of the present invention may be formed into a "curcumin oral preparation", i.e., an orally administrable preparation, such as hard capsules, soft capsules, tablets, granules, powders, fine granules, pills, troches, syrups, liquids, or drinkable preparations.

In this application, the dosage of the turmeric pigment composition of the present invention (an orally administrable curcumin preparation) depends on the consumer's age, body weight, symptom, dosage form, duration of treatment, and the like. According to a technical report from the WHO, the ADI (Acceptable Daily Intake) of curcumin is 0 to 3 mg/kg of body weight/day, and the NOAEL (no-observed-adverse-effect level) is 250 to 320 mg/kg of body weight/day (WHO Technical Report Series: page 33). The curcumin composition can be administered at one time, or divided into several doses within this range.

(III) Method for Dispersing Turmeric Pigment in Aqueous Solution and Method for Stabilizing the Dispersion As described above, the turmeric pigment is sparingly water-soluble, thus the pigment as such has extremely poor dispersibility in water. The present invention provides a method for dispersing a turmeric pigment in a hydrous solution and stabilizing the dispersion.

The method can be carried out by pulverizing (processing into fine particles) a turmeric pigment in a gum ghatti hydrous solution until the average particle diameter (median diameter) of the turmeric pigment falls to 1 µm or below. The thus-obtained liquid turmeric pigment composition is capable of being stably dispersed in a hydrous solution even when it contains a turmeric pigment at a high color value, specifically, at a color value (10%) of 3000 at maximum, more preferably 4500 at maximum.

The proportion of the gum ghatti and the turmeric pigment used in this method as raw materials, the pulverization method, and the conditions are the same as the aforementioned proportion, pulverization method (processing of pigment into fine particles) and conditions applied in the preparation of a turmeric pigment composition.

It is preferable that the turmeric pigment is pulverized by the above pulverization method as finely as possible. More specifically, the turmeric pigment is preferably pulverized to the extent that the resulting particles have an average particle diameter (median diameter d50) of 1 µm or below, more preferably 0.9 µm or below, further preferably 0.5 µm or below. By being pulverized into powder having the specific average particle diameter or below in the gum ghatti hydrous solution, dispersibility in the hydrous solution increases, and aggregation and sedimentation over time are prevented, thereby increasing dispersion stability. After the pulverization (processing into fine particles), the turmeric pigment liquid composition thus-prepared may further be subjected to a homogenization treatment. The method of homogenization treatment is not particularly limited insofar as the method is capable of evenly dispersing the respective components including the pulverized turmeric pigment. For example, the homogenization treatment may be performed using an emulsification/dispersion device such as a nano-mizer, a microfluidizer, a homogenizer, or an ultrasonic disperser.

(IV) The Method for Improving Absorbability of Turmeric Pigment into the Body Upon Oral Administration The turmeric pigment has a drawback in that its absorbability into the body is insufficient, even upon oral administration or oral intake. The present invention provides a method for improving the absorbability of the turmeric pigment into the body upon oral administration by modifying the form of the turmeric pigment.

The method can be carried out by forming the turmeric pigment preparation as a mixture of a turmeric pigment in the form of fine particles having an average particle diameter (median diameter) of 1 µm or below, and gum ghatti. Specifically, the mixture is prepared by pulverizing (processing into fine particles) a turmeric pigment in a gum ghatti hydrous solution until the average particle diameter (median diameter) of the turmeric pigment falls to 1 µm or below.

The proportion of the gum ghatti and the turmeric pigment used in this method as raw materials, the pulverization method, and the conditions are the same as the aforementioned proportion, pulverization method (processing of pigment into fine particles) and conditions applied in the preparation of a turmeric pigment composition.

It is preferable that the turmeric pigment is pulverized by the above pulverization method as finely as possible. More specifically, the turmeric pigment is preferably pulverized to an extent that the resulting particles have an average particle diameter (median diameter d50) of 1 µm or below, more preferably 0.9 µm or below, further preferably 0.5 µm or below. By being pulverized into powder having the specific average particle diameter or below in the gum ghatti hydrous solution, the absorbability of a turmeric pigment into the body upon oral administration or oral intake significantly increases (Experiment 5). After the pulverization (processing into fine particles), as described above, the turmeric pigment liquid composition thus-prepared may further be subjected to a homogenization treatment.

Moreover, as necessary, by further processing the turmeric pigment liquid composition into dry powder, it is possible to prepare a powdered mixture (turmeric pigment powdered composition). Additionally, by further processing the turmeric pigment powdered composition into granules, or by tabletting the turmeric pigment powdered composition, it is possible to prepare a turmeric pigment composition in the form of granules (turmeric pigment granular composition) or in the form of tablets (turmeric pigment tablet composition). The granular or tablet-form turmeric pigment composition may be prepared using any common formulation method by adding, as necessary, known additives (excipients, binders, lubricants, disintegrants, or the like) generally used in this field.

EXAMPLES

The present invention is explained in detail below with reference to Examples, Comparative Examples, and the like. However, the present invention is not limited to these examples. In the formulations, "part by mass" is applied as the units of the values, unless otherwise specified.

Experiment 1: Preparation of Turmeric Pigment Liquid Composition (1) Preparation of Turmeric Pigment Liquid Composition Table 1 shows formulations of Invention Samples 1 to 9 (Examples 1 to 9), and Table 2 shows formulations of Comparative Samples 1 to 7 (Comparative Examples 1 to 7), and a control.

In Invention Samples 1 to 9 and Comparative Samples 1 to 6, among the components in the formulations of Tables 1 and 2, gum ghatti (gum ghatti SD: San-Ei Gen F.F.I., Inc.), gum arabic, xanthane gum, or gum karaya are first added to water so as to prepare an aqueous solution of polysaccharide thickener.

Then, a powdered turmeric pigment (curcumin powder No. 3705: San-Ei Gen F.F.I., Inc., average particle diameter (d50): 13.81 µm, in the form of crystal) (color value (10%)=15000) was added to each aqueous solution. The powdered turmeric pigment is dispersed in the aqueous solution and mixed therewith, and water was added to adjust the mass. Here, the color value (10%) of the powdered turmeric pigment designates a value found according to the formula for finding color value stated in the Japanese Standards of Food Additives; i.e., a value found by diluting the powdered turmeric pigment in ethanol, measuring the absorbency of the ethanol solution at a maximum absorption wavelength (in the vicinity of 425 nm) in the visible region, and then converting the absorbency to the absorbency of a 10 w/v % solution.

Each mixture fluid in which the powdered turmeric pigment is dispersed was then subjected to wet pulverization using a wet pulverizer Dyno Mill (Dyno Mill KDL: product of W.A. Bachofen), and was then subjected to homogenization using a homogenizer (high-pressure homogenizer, model 15MR-8TA: produced by APV Gaulin Inc.) to give a turmeric pigment liquid composition (Invention Samples 1 to 9, Comparative Samples 1 to 6).

In contrast, Comparative Sample 7 is a turmeric pigment liquid composition prepared without performing wet pulverization and homogenization after dispersing powdered turmeric pigment (the same as above) in the thus-prepared gum ghatti aqueous solution, and mixing the powder with the solution (Comparative Sample 7 has the same formulation as that of Invention Sample 3, except for pulverization and homogenization). Further, the control is a turmeric pigment liquid composition prepared by adding powdered turmeric pigment (the same as above) to water instead of the gum ghatti aqueous solution, and subjecting the mixture dispersion to wet pulverization using the wet pulverizer Dyno Mill, and to homogenization using a homogenizer.

(2) Evaluation of Turmeric Pigment Liquid Composition (2-1) Average Particle Diameter of Turmeric Pigment As a comparison between the resulting turmeric pigment liquid compositions (Invention Samples 1 to 9, Comparative Samples 1 to 7, and a control), the respective average particle diameters of these turmeric pigment liquid compositions were evaluated by measuring the median diameters (d50). The median diameters (d50) were measured using a laser diffraction particle size analyzer Microtrac MT-3000II (wet type, product of Microtrac, Inc.) (measurement conditions; refraction index: 1.81, measurement range: 0.021-2000 µm, particle size distribution: volumetric basis). As the particle size decreases, the median diameter (d50) (µm) decreases. The median diameter (d50) (µm) increases when the composition contains coarse particles or agglomerates. Tables 1 and 2 show the results.

TABLE 1

|  | Invention Sample 1 | Invention Sample 2 | Invention Sample 3 | Invention Sample 4 | Invention Sample 5 | Invention Sample 6 | Invention Sample 7 | Invention Sample 8 | Invention Sample 9 |
|---|---|---|---|---|---|---|---|---|---|
| Gum Ghatti | 0.1 (1) * | 1 (10) * | 5 (50) * | 10 (100) * | 10 (200) * | 15 (300) * | 4 (27) * | 8 (53) * | 4 (20) * |
| Gum Arabic | — | — | — | — | — | — | — | — | — |
| Xanthane Gum | — | — | — | — | — | — | — | — | — |
| Gum Karaya | — | — | — | — | — | — | — | — | — |
| Turmeric Pigment | 10 (100) | 10 (100) | 10 (100) | 10 (100) | 5 (100) | 5 (100) | 15 (100) | 15 (100) | 20 (100) |
| Total Amount After Adding Water | 100 | 100 | 100 | 100 | 100 | 100 | 100 | 100 | 100 |
| Average Particle Diameter of Turmeric Pigment (d50) (μm) | 0.69 | 0.42 | 0.26 | 0.31 | 0.39 | 0.91 | 0.17 | 0.26 | 0.33 |
| Presence or Absence of Aggregation | — | — | — | — | — | — | None | None | None |

(mass %)

The symbol "*" indicates parts by mass of gum ghatti with respect to 100 parts by mass of the total amount of turmeric pigment.
The symbol "—" indicates that the test was not conducted.

TABLE 2

|  | Comparative Sample 1 | Comparative Sample 2 | Comparative Sample 3 | Comparative Sample 4 | Comparative Sample 5 | Comparative Sample 6 | Comparative Sample 7 (no pulverization) | Control |
|---|---|---|---|---|---|---|---|---|
| Gum Ghatti | — | — | — | — | — | — | 5 (50) ** | — |
| Gum Arabic | — | — | 0.1 (1) ** | 10 (100) ** | 30 (300) ** | 10 (67) ** | — | — |
| Xanthane Gum | 1 (10) ** | — | — | — | — | — | — | — |
| Gum Karaya | — | 1 (10) ** | — | — | — | — | — | — |
| Turmeric Pigment | 10 (100) | 10 (100) | 10 (100) | 10 (100) | 10 (100) | 15 (100) | 10 (100) | 10 (100) |
| Total Amount After Adding Water | 100 | 100 | 100 | 100 | 100 | 100 | 100 | 100 |
| Average Particle Diameter of Turmeric Pigment (d50) (μm) | 2.58 | 2.35 | 0.92 | 0.41 | 0.46 | 0.53 | 13.81 | 3.01 |
| Presence or Absence of Aggregation | — | — | — | — | — | Observed | None | Observed |

The symbol "**" indicates parts by mass of gum ghatti, gum arabic, xanthane gum, or gum karaya with respect to 100 parts by mass of the total amount of turmeric pigment.
The symbol "—" indicates that the test was not conducted.

Invention Samples 1 to 9 were evenly and entirely colored, even after storage at 60° C. for 7 days. It was also confirmed that there was no precipitation on the bottoms of the containers, and that the turmeric pigment was desirably and stably dispersed. In particular, it was confirmed that almost no precipitation was seen on the bottoms of the containers of Invention Samples 2 to 4, showing that they had excellent dispersion stabilities.

(2-2) Presence/Absence of Aggregation

For Invention Samples and Comparative Samples, Invention Samples 7 to 9, Comparative Samples 6 to 7, and the control, the presence or absence of aggregation was observed using a microscope (600× magnification; objective: 40×, eyepiece: 15×). The results showed that the control prepared without a polysaccharide thickener contained aggregation equivalent to 10 mass % of the turmeric pigment, that Comparative Sample 6 prepared using gum arabic as a polysaccharide thickener contained aggregation equivalent to 15 mass % of the turmeric pigment, and that Invention Samples 7 to 9 prepared using gum ghatti contained no aggregation, even when the content of the turmeric pigment was 15 mass % or more (see Tables 1 and 2).

The above results revealed that, by adding a turmeric pigment to a gum ghatti aqueous solution, and pulverizing the pigment in the solution by wet pulverization, it is possible to decrease the average particle diameter (median diameter) of the turmeric pigment dispersed in the gum ghatti aqueous solution to 1 μm or below (Invention Samples 1 to 9: see Table 1). Thus, it was confirmed that the resulting Invention Samples 1 to 9 were superior in stability over time, and that they ensured excellent dispersion stabilities and suppression of aggregation and sedimentation of the turmeric pigment, even on the 7th day of storage in the original form (liquid).

On the other hand, in the example using xanthane gum (Comparative Sample 1) or gum karaya (Comparative Sample 2) instead of gum ghatti, the average particle diameter (d50) of the turmeric pigment was not decreased to 1 μm or below by pulverization (the average particle diameter (d50) of the turmeric pigment: 2.35 to 2.58 μm), as in the control (the average particle diameter (d50) of the turmeric pigment: 3.01 μm) prepared without a polysaccharide thickener. In particular, in Comparative Sample 2 and Comparative Sample 3 respectively using xanthane gum and gum karaya instead of gum ghatti, pulverization became more difficult as the pulverization proceeded, because the viscosity of the solution became extremely high.

In contrast, in Comparative Samples 3 to 6 prepared using gum arabic instead of gum ghatti, the average particle diameter (d50) of the turmeric pigment was decreased to 1 μm or below by pulverization as in Invention Samples 1 to 9 prepared using gum ghatti. However, as mentioned above, Comparative Sample 6 contained aggregation. The aggregation was likely to become significant as the content of the turmeric pigment increased. Further, when the content of the turmeric pigment is 15 mass % or more as in Comparative Sample 6, the viscosity of the gum arabic aqueous solution during pulverization was considerably high, causing difficulty in preparation.

Experiment 2: Preparation of Beverage and Evaluation Thereof

Each of the turmeric pigment liquid compositions (Invention Samples 1 to 9, Comparative Samples 1 to 7, control) prepared in Experiment 1 was placed in a 200 ml transparent beverage glass vial. Using each sample, a soft drink was prepared according to the following formulation so that the final content of the turmeric pigment falls 0.3 mass %. Each drink was allowed to stand still, and kept at room temperature (25° C.) after sterilization by hot packing at 93° C.

| Formulation of Soft Drink | |
|---|---|
| High fructose corn syrup (Brix 75°) | 13.30% |
| Citric acid (anhydrous) | 0.20% |
| Trisodium citrate | 0.10% |
| Vitamin C | 0.02% |

Turmeric Pigment Composition $$\frac{\left(\begin{array}{c}\text{the amount was adjusted}\\ \text{to make the final content 0.3 mass \%}\end{array}\right)}{\text{Ion exchange water was added to 100.00\%}}$$

On the 7th day of stationary storage, the dispersion stability of the turmeric pigment in the drink was examined based on the criteria shown in Table 3. Table 4 shows the result. Further, FIG. 1 shows the observation results (images) for Invention Drink 3 (left-hand side; colored by a turmeric pigment liquid composition (Invention Sample 3)) and Comparative Drink 7 (right-hand side; colored by a turmeric pigment liquid composition (Comparative Sample 7)) on the 7th day of storage at room temperature.

TABLE 3

| Evaluation | Evaluation Criteria of Dispersion Stability of Turmeric Pigment in Drink (state on the 7th day of storage at room temperature) |
|---|---|
| A-1 | There are no problems with the quality of the drink: the drink is evenly and entirely colored, and dispersibility is very good. Almost no precipitation is observed. |
| A-2 | There are no problems with the quality of the drink: the drink is evenly and entirely colored, and dispersibility is very good. Upon careful observation, slight precipitation is found on the bottom of the container. |
| B | Slight problems are found with the quality of the drink: The drink is evenly and entirely colored, and dispersibility is good. Precipitation of turmeric pigment is clearly observed visually on the bottom of the container. |
| C-1 | There are problems with the quality of the drink: The upper layer portion of the drink placed in a container starts to become transparent, and precipitation of turmeric pigment is clearly observed on the bottom of the container. |
| C-2 | There are problems with the quality of the drink: The upper layer portion of the drink placed in a container is completely transparent, and precipitates of turmeric pigment accumulate on the bottom of the container to form a layer. |
| C-3 | There are problems with the quality of the drink: The middle layer portion and the portion thereabove (middle layer to upper layer) of the drink placed in a container are transparent, and precipitates of turmeric pigment accumulate at the bottom of the container to form a layer. A number of precipitation layers are formed. |
| C-4 | There are problems with the quality of the drink: Turmeric pigment completely precipitates, and the drink placed in a container is transparent. |

TABLE 4

| | Evaluation of Dispersion Stability (state on the 7th day of storage at room temperature) | |
|---|---|---|
| Invention Drink 1 (Invention Sample 1) | The drink was evenly and entirely colored, and turmeric pigment was very well-dispersed. However, slight precipitation of turmeric pigment was observed on the bottom of the container. | A-2 |
| Invention Drink 2 (Invention Sample 2) | The drink was evenly and entirely colored, and turmeric pigment was very well-dispersed. Almost no precipitation was observed. | A-1 |
| Invention Drink 3 (Invention Sample 3) | The drink was evenly and entirely colored, and turmeric pigment was very well-dispersed. Almost no precipitation was observed. | A-1 |
| Invention Drink 4 (Invention Sample 4) | The drink was evenly and entirely colored, and turmeric pigment was very well-dispersed. Almost no precipitation was observed. | A-1 |
| Invention Drink 5 (Invention Sample 5) | The drink was evenly and entirely colored, and turmeric pigment was very well-dispersed. Almost no precipitation was observed. | A-1 |
| Invention Drink 6 (Invention Sample 6) | The drink was evenly and entirely colored, and turmeric pigment was very well-dispersed. However, slight precipitation of turmeric pigment was observed on the bottom of the container. | A-2 |
| Invention Drink 7 (Invention Sample 7) | The drink was evenly and entirely colored, and turmeric pigment was very well-dispersed. Almost no precipitation was observed. | A-1 |
| Invention Drink 8 (Invention Sample 8) | The drink was evenly and entirely colored, and turmeric pigment was very well-dispersed. Almost no precipitation was observed. | A-1 |
| Invention Drink 9 (Invention Sample 9) | The drink was evenly and entirely colored, and turmeric pigment was very well-dispersed. Almost no precipitation was observed. | A-1 |

TABLE 4-continued

Evaluation of Dispersion Stability (state on the 7th day of storage at room temperature)

| | | |
|---|---|---|
| Comparative Drink 1 (Comparative Sample 1) | Most of the turmeric pigment precipitated, and the turmeric pigment and the liquid were separated. | C-3 |
| Comparative Drink 2 (Comparative Sample 2) | Most of the turmeric pigment precipitated, and the turmeric pigment and the liquid were separated. | C-3 |
| Comparative Drink 3 (Comparative Sample 3) | The drink was evenly and entirely colored, and dispersibility was good. However, turmeric pigment was found to circumferentially precipitate on the bottom of the drink container. | B |
| Comparative Drink 4 (Comparative Sample 4) | The drink was evenly and entirely colored, and dispersibility was good. However, turmeric pigment was found to circumferentially precipitate on the bottom of the drink container. | B |
| Comparative Drink 5 (Comparative Sample 5) | The drink was evenly and entirely colored, and dispersibility was good. However, turmeric pigment was found to circumferentially precipitate on the bottom of the drink container. | B |
| Comparative Drink 6 (Comparative Sample 6) | The drink was evenly and entirely colored, and dispersibility was good. However, turmeric pigment was found to circumferentially precipitate on the bottom of the drink container. | B |
| Comparative Drink 7 (Comparative Sample 7) | Immediately after the drink was prepared, the drink was evenly and entirely colored, and good dispersibility was observed. However, after storage, turmeric pigment completely precipitated, and the drink, except for the precipitation portion, became transparent. | C-4 |
| Control Drink (Control) | Turmeric pigment completely precipitated, and the drink, except for the precipitation portion, was completely transparent. | C-4 |

According to the results of 7-day storage at room temperature of the beverages (Invention Drinks 1 to 9: Examples 10 to 18) prepared using turmeric pigment liquid compositions (Invention Samples 1 to 9: Examples 1 to 9), which were prepared by adding a turmeric pigment to a gum ghatti aqueous solution and pulverizing the turmeric pigment therein, it was revealed that the turmeric pigment liquid compositions of the present invention did not cause precipitation of turmeric pigment and were capable of stably adding color to an aqueous product such as a beverage, even when the turmeric pigment concentrations of the compositions were adjusted by dilution to an extent that it can add color to a beverage.

On the other hand, the result of Comparative Drink 7 prepared using a turmeric pigment liquid composition (Comparative Sample 7), which was prepared only by adding the turmeric pigment to a gum ghatti aqueous solution without pulverization, revealed that, although the beverage immediately after the preparation was evenly colored and had desirable dispersibility, the turmeric pigment was completely precipitated after 7-day storage at room temperature because of its insufficient dispersing effect; and the beverage became colorless and transparent. This shows that to prepare a turmeric pigment liquid composition ensuring a stable coloring effect, it is necessary to pulverize the turmeric pigment into fine particles (preferably, followed by homogenization) after the pigment is added to the gum ghatti aqueous solution.

Further according to the results of turmeric pigment liquid compositions (Comparative Drinks 3 to 6) colored with a turmeric pigment liquid composition (Comparative Samples 3 to 6), which was prepared using gum arabic instead of gum ghatti, it was revealed that, although they were desirably colored (Level B), the dispersion stability during the storage was insufficient compared with the beverages (Invention Drinks 1 to 9) prepared using the turmeric pigment liquid compositions (Invention Samples 1 to 9) that were prepared using gum ghatti. After 7-day storage at room temperature, precipitates of turmeric pigment were observed on the bottom of the container.

Experiment 3: Relationship Between Average Particle Diameter and Dispersibility of Turmeric Pigment The following discusses a result of a study regarding a relationship between the average particle diameter (d50) of the turmeric pigment contained in the turmeric pigment liquid composition, and dispersibility of turmeric pigment in the turmeric pigment liquid composition.

(1) Preparation of Test Composition (Turmeric Pigment Liquid Composition)

Seven transparent containers (200 ml), each containing 50 ml of turmeric pigment liquid composition (gum ghatti=4 mass %, turmeric pigment=15 mass %, water=71 mass %) having the same formulation as that of Invention 7 of Experiment 1 were prepared (Samples A to G). 50 ml of zirconia beads having a diameter of 1 mm was added to each of the Samples A to G, and the beads were mixed with liquid at a rotating speed of 1500 rpm. The samples were processed for different durations, and the stirring was stopped at respective given times. Then, the zirconia beads were separated by filtration from the liquids; and, for Samples A to D, the average particle diameters (median diameter: d50) of the turmeric pigments were measured. On the other hand, Samples E to G were further subjected to pulverization using a wet pulverizer Dyno Mill (Dyno Mill KDL-A: product of W.A. Bachofen); thereafter, the average particle diameters (median diameter d50) of the respective turmeric pigments were measured. The average particle diameters were measured using a laser diffraction particle size analyzer Microtrac MT-3000II (product of Microtrac INC.: wet type) (measurement conditions; refraction index: 1.81, measurement range: 0.021-2000 μm, particle size distribution: volumetric basis), as in Experiment 1.

(2) Average Particle Diameter (Median Diameter d50) of Turmeric Pigment and Presence/Absence of Aggregation Table 5 shows the measurement results of average particle diameters (median diameter d50) of Samples A to G after pulverization. Further, the presence or absence of aggregation after the pulverization in each sample was observed using a microscope (600× magnification; objective: 40×, eyepiece: 15×). Table 5 also shows the observation results.

TABLE 5

| Sample | Average Particle Diameter of Turmeric Pigment (d50) | Presence or Absence of Aggregation (Microscopic Observation) |
|---|---|---|
| A | 22.75 μm | Aggregation was not observed. |
| B | 8.54 μm | Aggregation was not observed. |
| C | 3.81 μm | Aggregation was not observed. |
| D | 1.78 μm | Aggregation was not observed. |
| E | 0.86 μm | Aggregation was not observed. |
| F | 0.40 μm | Aggregation was not observed. |
| G | 0.19 μm | Aggregation was not observed. |

Figure 2:
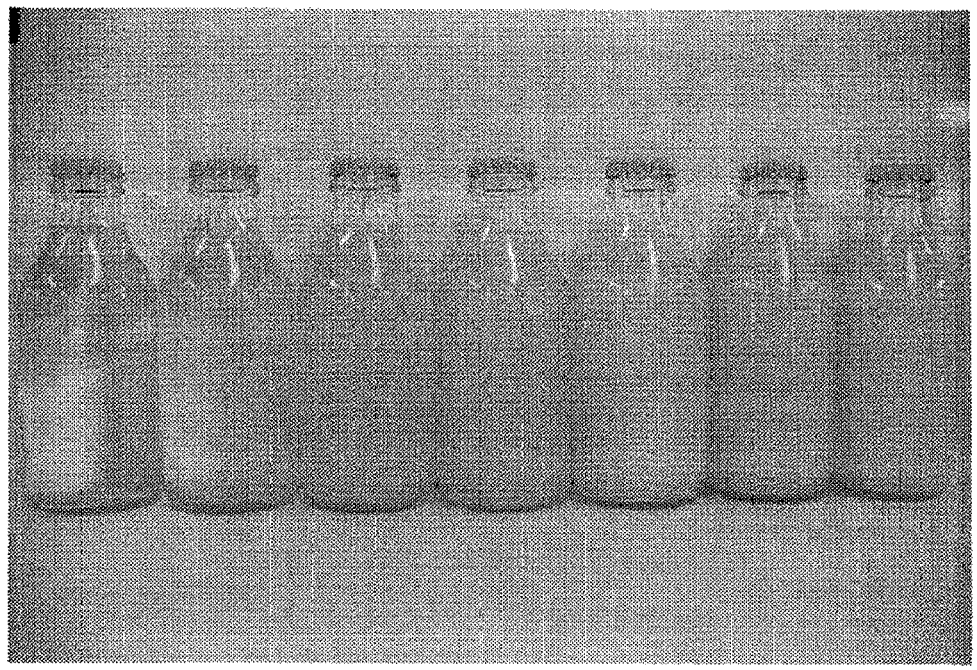
FIG. 2 Images showing observation results of turmeric pigments in Drinks A to G (from left- to right-hand side) of the present invention prepared in Experiment 3 on the third day of stationary preservation at 60° C.
Figure 2:
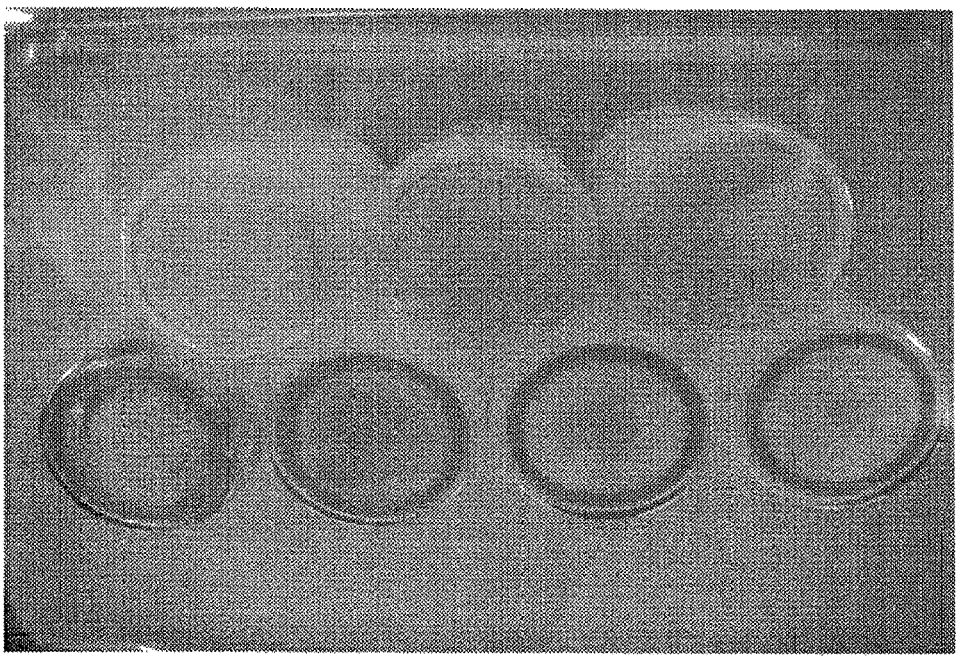

(3) Preparation of Beverages and Evaluation of Dispersion Stability of Turmeric Pigment Each of the turmeric pigment liquid compositions (Samples A to G) prepared in the above step (i) was placed in a 200 ml transparent beverage glass vial (see FIG. 2). Each sample was diluted with ion exchange water so that the final content of the turmeric pigment falls 0.15 mass %, thereby preparing a drink (Drinks A to G). Each drink was allowed to stand still, and kept for three days at 60° C. after sterilization by hot packing at 93° C.

The dispersion stability of the turmeric pigment in each drink was examined by measuring turbidity (720 nm) of the upper layer of the drink immediately after the thermal sterilization, and on the 3rd day of storage at 60° C.; further, precipitation of the turmeric pigment in the drink was evaluated on the 3rd day of storage at 60° C. Table 6 shows the results. The turbidity of each drink was found by measuring an absorbency of the drink at a wavelength of 720 nm; or, as required, by measuring an absorbency (wavelength=720 nm) of an arbitrarily diluted drink, and converting the value according to the dilution rate. FIG. 2(a) shows an image of Drinks A to G on the 3rd day of stationary storage at 60° C. viewed from a lateral side, and FIG. 2(b) shows an image of the same drinks viewed from the bottom of the beverage container.

TABLE 6

| Drink | Average Particle Diameter of Turmeric Pigment in Sample (turmeric pigment liquid composition) (d50) | Turbidity of Upper Layer Portion of Drink (720 nm) Immediately after thermal sterilization | On the 3rd day of storage at 60° C. | Precipitation of Turmeric Pigment |
|---|---|---|---|---|
| A | 22.75 | 0.135 | 0.006 | Turmeric pigment completely precipitated, and the drink became transparent. |
| B | 8.54 | 0.503 | 0.073 | The upper to middle layers of the drink became transparent, and a large amount of turmeric pigment precipitated. |
| C | 3.81 | 0.997 | 0.222 | The upper layer of the drink became transparent, and precipitation of turmeric pigment was clearly observed. |
| D | 1.78 | 1.980 | 0.675 | The upper layer of the drink started to become transparent, and precipitation of turmeric pigment was clearly observed. |
| E | 0.86 | 2.190 | 2.112 | Precipitates of turmeric pigment were only found to accumulate in about a two-thirds circumference in a circular concave portion on the bottom of the container, and were notably reduced. |
| F | 0.40 | 2.332 | 2.276 | Precipitates of turmeric pigment were only found to accumulate in about a one-third circumference in a circular concave portion on the bottom of the container, and were notably reduced. |
| G | 0.19 | 2.030 | 2.010 | Slight precipitation of turmeric pigment was observed on the bottom of the container, and was notably reduced. |

The results show that, when the average particle diameter (median diameter) of the turmeric pigment contained in the turmeric pigment liquid composition (Samples A to G) is more than 1 μm, the redispersibility of the composition in the aqueous solution and dispersion stability decrease, thereby causing precipitation of a large amount of turmeric pigment over time. On the other hand, when the average particle diameter (median diameter) of the turmeric pigment contained in the turmeric pigment liquid composition (Samples A to G) is 1 μm or below, desirable redispersibility in the aqueous solution and desirable dispersion stability are obtained; accordingly, the turmeric pigment can be stably dispersed for a long period of time in a hydrous solution while significantly preventing aggregation and sedimentation over time.

Experiment 4: Comparison with Prior Art Document (Japanese Unexamined Patent Publication No. H3-97761)

Japanese Unexamined Patent Publication No. H3-97761 (Prior Art Document) discloses that a complex of curcumin and a polysaccharide such as gum ghatti, which is formed by contacting curcumin and a polysaccharide such as gum ghatti in an alkaline aqueous solution at a pH of 9 or above, and then acidifying the solution by dropping the pH to 8 or below, is useful as a water-soluble pigment that ensures improved light stability and coloring ability.

Therefore, complexes were made using gelatin, gum arabic, and gum ghatti as polysaccharides, according to Examples 2 and 3 of the aforementioned prior art document. Then, a drink was prepared using each complex, and the dispersion stability of each drink was evaluated as a comparison of the complex with the turmeric pigment liquid composition of the present invention.

(1) Preparation of Complex of Curcumin and Polysaccharide 7.5 g of powdered turmeric pigment (curcumin powder No. 3705: San-Ei Gen F.F.I., Inc., average particle diameter (d50): 22.75 μm, in the form of crystal) (color value (10%)=15000) was added to 92.5 g of water under stirring, and a 10% KOH aqueous solution was added thereto to adjust the pH to 12, thereby dissolving the turmeric pigment. The resulting liquid was filtrated to remove insoluble matter of the turmeric pigment, thereby obtaining a 7.5% KOH aqueous solution of turmeric pigment.

Thereafter, a 2% gelatin aqueous solution (see Example 2 of the aforementioned Prior Art Document), a 10% gum arabic aqueous solution (see Example 3 of the aforementioned Prior Art Document), and a 10% gum ghatti aqueous solution (see Example 3 of the aforementioned Prior Art Document) were prepared; and a 10% KOH aqueous solution was added to each solution to adjust the pH to 12. The 7.5% KOH aqueous solution of turmeric pigment thus prepared above was added to 92.5 g each of these solutions, and mixed for 10 minutes.

Then, while stirring the mixtures, a 10% phosphoric acid aqueous solution was added to each mixture to adjust the pH to 4.5.

TABLE 7

|  | Sample a | Sample b | Sample c |
|---|---|---|---|
| Turmeric Pigment 7.5% KOH Solution | 7.5 g | 7.5 g | 7.5 g |
| 2% Gelatin Aqueous Solution | 92.5 g | — | — |
| 2% Gum Arabic Aqueous Solution | — | 92.5 g | — |
| 10% Gum Ghatti Aqueous Solution | — | — | 92.5 g |

(2) Average Particle Diameter (Median Diameter d50) of Turmeric Pigment and Presence/Absence of Aggregation For each of Samples a to c, the average particle diameter (median diameter: d50) of the turmeric pigment was measured using a laser diffraction particle size analyzer Microtrac MT-3000II (product of Microtrac, Inc.: wet type) (measurement conditions; refraction index: 1.81, measurement range: 0.021-2000 μm, particle size distribution: volumetric basis). Table 8 shows the results. Further, the presence or absence of aggregation after the pulverization of each sample was observed using a microscope (600× magnification; objective: 40×, eyepiece: 15×). Table 8 also shows the observation results.

TABLE 8

| Sample | Average Particle Diameter of Turmeric Pigment (d50) | Presence or Absence of Aggregation (Microscopic Observation) |
|---|---|---|
| a | 166.9 μm | A very slight amount of aggregated particles was observed. |
| b | 11.84 μm | A very slight amount of aggregated particles was observed. |
| c | 4.26 μm | A very slight amount of aggregated particles was observed. |

Figure 3:
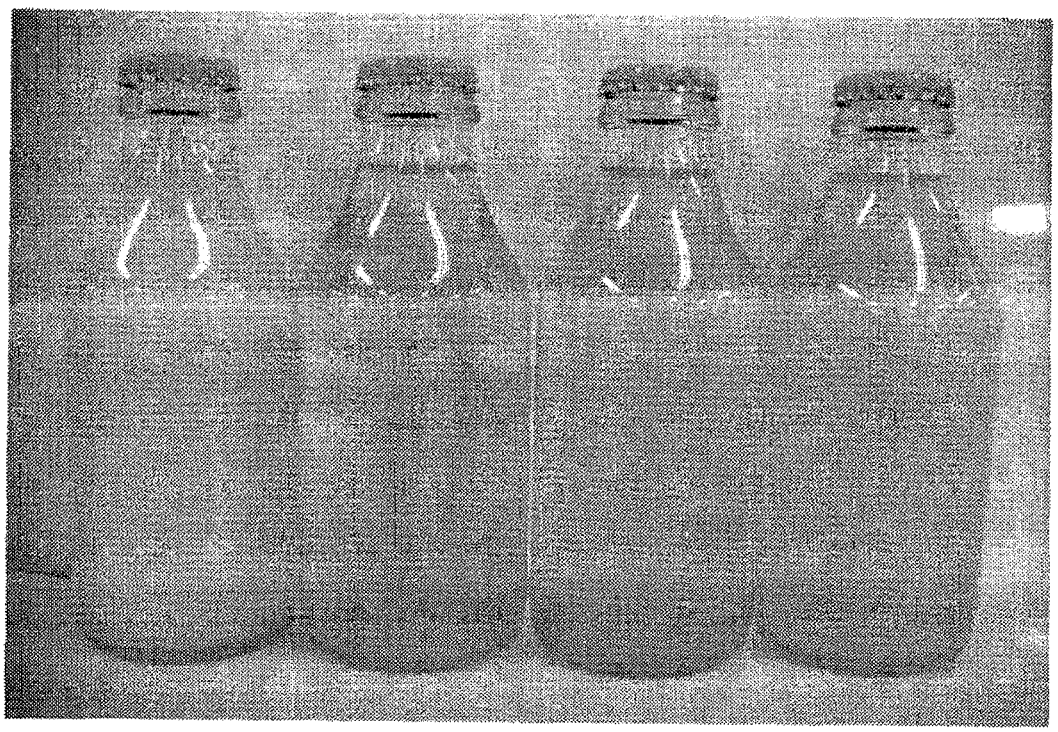
FIG. 3 Images showing observation results of turmeric pigments in Drink 7 of the present invention and Drinks a to c prepared in Experiment 4 on the third day of stationary preservation at 60° C. (from left to right, Beverage 7 of the present invention and Drinks a to c).
Figure 3:
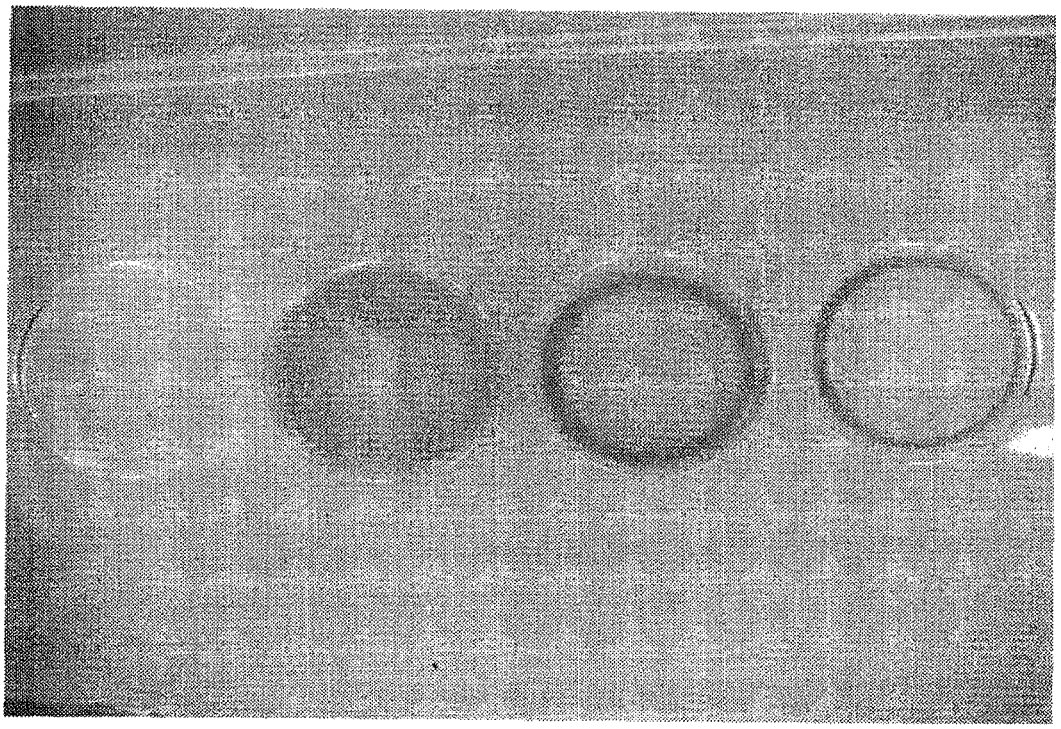

(3) Preparation of Beverages and Evaluation of Dispersion Stability of Turmeric Pigment Each of Samples a to c prepared in the above step (1) was placed in a 200 ml transparent beverage glass vial (see FIG. 3). Each sample was diluted with ion exchange water so that the final content of the turmeric pigment falls 0.15 mass %, thereby preparing a drink (Drinks a to c). Each drink was allowed to stand still, and kept for 3 days at 60° C. after sterilization by hot packing at 93° C. Further, for comparison, Invention Sample 7 prepared in Experiment 1 was also placed in a transparent beverage glass vial, and was diluted with ion exchange water so that the final content of the turmeric pigment falls 0.15 mass %, thereby preparing a drink (Invention Drink 7). The drink was allowed to stand still, and kept for 3 days at 60° C. after sterilization by hot packing at 93° C.

The dispersion stability was examined by measuring turbidity (720 nm) of the upper layer of the drink immediately after the thermal sterilization, and on the 3rd day of storage at 60° C.; further, precipitation of the turmeric pigment in the drink was evaluated on the 3rd day of storage at 60° C. Table 9 shows the results. The turbidity of each drink was found by measuring an absorbency of the drink at a wavelength of 720 nm; or, as required, by measuring an absorbency (wavelength=720 nm) of an arbitrarily diluted drink, and converting the value according to the dilution rate. FIG. 3(a) shows an image of Inventions Drinks a to c on the 3rd day of stationary storage at 60° C. viewed from a lateral side, and FIG. 3(b) shows an image of the same drinks viewed from the bottom of the beverage container.

TABLE 9

| Drink | Average Particle Diameter of Turmeric Pigment in Sample (d50) | Turbidity of the Upper Layer Portion of Drink (720 nm) | | Precipitation of Turmeric Pigment |
|---|---|---|---|---|
| | | Immediately after thermal sterilization | On the 3rd day of storage at 60° C. | |
| a | 166.9 μm | 0.149 | 0.025 | The upper to middle layers of the drink became transparent, and a large amount of turmeric pigment precipitated. |
| b | 11.84 μm | 0.277 | 0.074 | The upper layer of the drink became transparent, and precipitation of turmeric pigment was clearly observed. |
| c | 4.26 μm | 0.253 | 0.085 | The upper layer of the drink became transparent, and precipitation of turmeric pigment was clearly observed. |
| Invention Drink 7 | 0.17 μm | 2.012 | 2.004 | The drink was evenly and entirely colored, and turmeric pigment was very well-dispersed. Almost no precipitation was observed. |

The results show that the dispersion stability of the complex of curcumin and polysaccharide (gelatin, gum arabic, gum ghatti) prepared according to the method disclosed in Japanese Unexamined Patent Publication No. H3-97761 (Prior Art Document) is clearly inferior to the turmeric pigment liquid composition (see Experiment 1) of the present invention in the usage as a beverage colorant.

Example 19: Shaved Ice Syrup

A shaved ice syrup (a syrup of the present invention) was prepared according to the following formulation using the turmeric pigment liquid composition (Invention Sample 3) prepared in Experiment 1.

| Formulation of Shaved Ice Syrup | |
|---|---|
| Liquid sugar | 65.0 g |
| Sugar | 3.0 g |
| Citric acid | 0.25 g |

-continued

| Formulation of Shaved Ice Syrup | |
| --- | --- |
| Dietary salt | 0.15 g |
| Turmeric pigment liquid composition (Invention Sample 3) | 0.05 g |
| Water | 31.55 g |
| Total | 100.00 g. |

The thus-obtained syrup of the present invention had a vivid yellow color. Further, no precipitation of the turmeric pigment was generated in the syrup; that is, the syrup was stable over time.

Example 20: Pineapple Sherbet

A pineapple sherbet (sherbet of the present invention) was prepared according to the following formulation using the turmeric pigment liquid composition (Invention Sample 3) prepared in Experiment 1.

| Formulation of Pineapple Sherbet | |
| --- | --- |
| Liquid sugar | 15.00 g |
| Powdered starch syrup | 7.50 g |
| Hardened coconut oil | 1.00 g |
| Powdered skim milk | 1.00 g |
| 1/5 concentrated pineapple juice | 4.00 g |
| Pineapple flavor | 0.10 g |
| Turmeric pigment liquid composition (Invention Sample 3) | 0.05 g |
| Water | 71.35 g |
| Total | 100.00 g |

The thus-obtained sherbet of the present invention had a vivid yellow color, and it was confirmed by visual inspection that the sherbet was evenly colored with the turmeric pigment.

Example 21: Lemon Drink

A lemon drink (a beverage of the present invention) was prepared according to the following formulation using the turmeric pigment liquid composition (Invention Sample 3) prepared in Experiment 1.

| Formulation of Lemon Drink | |
| --- | --- |
| High fructose corn syrup | 30.00 g |
| Sugar | 10.00 g |
| Citric acid | 0.40 g |
| 1/5 lemon juice | 4.40 g |
| Lemon flavor | 0.20 g |
| Turmeric pigment liquid composition (Invention Sample 3) | 0.05 g |
| Water | 54.95 g |
| Total | 100.00 g |

The thus-obtained lemon drink of the present invention had a bright lemon-yellow color. Further, no aggregation or precipitation of the turmeric pigment was generated over time; that is, the beverage was superior in color-developing property.

Example 22: Lemon Gum

Lemon gums were prepared according to the following formulation using a turmeric pigment liquid composition (Invention Sample 3) prepared in Experiment 1. Specifically, the materials other than the turmeric pigment composition (Invention Sample 3) were mixed under heat; then, the turmeric pigment composition (Invention Sample 3) was added thereto. The resulting paste was formed into a sheet with a mill roll, and then cut into pieces to obtain lemon gums (gum of the present invention).

| Formulation of Lemon Gum | |
| --- | --- |
| Gum base | 100.00 g |
| Purified glucose | 72.00 g |
| Powdered sugar | 100.00 g |
| Citric acid | 0.50 g |
| Lemon flavor | 0.15 g |

Turmeric pigment liquid composition (Invention Sample 3) 0.05 g.

The thus-obtained lemon gums of the present invention had a vivid yellow color with a bright tone, and the turmeric pigment composition was evenly mixed with the gum; thereby, the gum was evenly colored.

Example 23: Hard Candy

Hard candies were prepared using a turmeric pigment liquid composition (Invention Sample 3) prepared in Experiment 1. Specifically, a mixture of 20 g of water, 60 g of sugar, and 40 g of starch syrup was dissolved by heating to 150° C., and then boiled down to 100 g. Thereafter, the mixture was cooled to 120° C., and 0.05 g of a turmeric pigment composition (Invention Sample 3), 0.5 g of citric acid and 0.15 g of lemon flavor were added thereto. The mixture was then cut and shaped; and cooled to room temperature, thereby obtaining hard candies (candy of the present invention).

The thus-obtained lemon candies of the present invention had a vivid yellow color with a bright tone. Moreover, the turmeric pigment liquid composition of the present invention was evenly mixed with the materials quickly, thereby obtaining brightly colored hard candies.

Example 24: Preparation of Turmeric Pigment Powdered Composition 81 g of Dextrin NSD-C (manufactured by Nissi Co., Ltd.) was added to 119 g of water. The mixture was heated to 60° C. to homogeneously dissolve the dextrin. 100 g of the curcumin composition prepared in Experiment 3 was added to the mixture, followed by homogenization using a homogenizer. The homogenized mixture was then subjected to dry powderization using a spray dryer (produced by Tokyo Rikakikai Co, Ltd.). The resulting powder (curcumin powdered composition) had a color value (10%) of 2250 and, after the composition was dissolved (dispersed) in water, an average particle diameter (a particle size distribution (d50)) of 0.18 μm. This shows that a solid composition (turmeric pigment powdered composition) prepared by drying the turmeric pigment liquid composition of the present invention also has a superior redispersibility in water.

Example 25: Lemon Tablet

Lemon tablets were prepared according to the following formulation using a turmeric pigment powdered composition prepared in Example 24. Specifically, the following components were mixed in a powdered form, and the resulting powdered mixture was tabletted by a usual method using a tabletting machine, thereby preparing lemon tablets having a bright yellow color.

| Formulation of Lemon Tablet | |
|---|---|
| Sorbit | 95.0 g |
| Powdered curcumin preparation | 0.5 g |
| Calcium stearate (manufactured by Taihei Chemical Industrial Co., Ltd.)) | 1.5 g |
| Citric acid (anhydrous) | 1.0 g |
| Vitamin C | 1.0 g |
| Powdered lemon fragrance | 1.0 g. |

Experiment 5: Absorbency Test (1) Absorbency Test of Turmeric Pigment Using Turmeric Pigment Liquid Composition The turmeric pigment liquid composition (Invention Sample 7) prepared in Experiment 1 was diluted with a 1.5% gum arabic aqueous solution, and the diluted solution was administered to a SD rat (male, 8 weeks old, raised with free access to food and water) by forced oral administration in a curcumin administration amount of 50 mg or 300 mg (3 rats each) per kilogram of body weight. As a control, a powdered turmeric pigment (curcumin powder No. 3705: San-Ei Gen F.F.I., Inc., average particle diameter (d50): 22.75 μm, in the form of crystal) was dispersed in a 1.5% gum arabic aqueous solution, and the solution was administrated to SD rats in the same curcumin amount (50 mg/Kg or 300 mg/Kg).

Before administration, 1 hour after administration, 2 hours after administration, 4 hours after administration, 6 hours after administration, and 24 hours after administration, a blood sample was obtained from a caudal vein of each rat, and the obtained blood sample was centrifuged for 10 minutes at 4° C. and 3500 rpm, thereby obtaining plasma. The resulting plasma was preserved at −20° C. in a light-blocking condition until extraction.

At the measurement, the plasma was back to room temperature, and 100 μL thereof was placed in a stoppered centrifuge tube. 100 μL of β-glucuronidase (Wako), and 10 μL of a 0.1 M acetic acid buffer (a pH value=5.0) were placed therein, and the mixture was reacted for an hour in a 37° C. constant-temperature bath. Thereafter, 10 μL of mepronil (standard product, Wako, 0.5 μg/mL methanol solution), which is an internal standard material, was added thereto; and then 0.5 mL of chloroform was further added, and the mixture was mixed with a vortex mixer (1 minute). The mixture was subjected to ultrasonic treatment for 15 minutes, and then mixed again with a vortex mixer (1 minute). After centrifugation (3000 rpm, 5 minutes, 4° C.), a chloroform layer was obtained. Then, the steps after addition of chloroform were performed again using the resulting residue. The chloroform layer obtained first and the chloroform layer obtained in the second round were mixed together, and transferred to a drying/hardening sample tube. A nitrogen gas was sprayed thereto to distill off the solvent.

The residue was dissolved in a water:acetonitrile=1:1 solution; and the concentration of curcumin, which is a typical curcuminoid, was analyzed using a LC/MS/MS analyzer under the following condition.
column: Atlantis T3 (manufactured by Waters, 2.1×150 mm, 3μ),
column temperature: 40° C., mobile phase: gradient analysis using a 0.005% formic acid aqueous solution, 0.005% formic acid/acetonitrile solution, ionization mode: electrospray ionization (ESI) positive mode, measurement mode: MRM mode.

Figure 4:
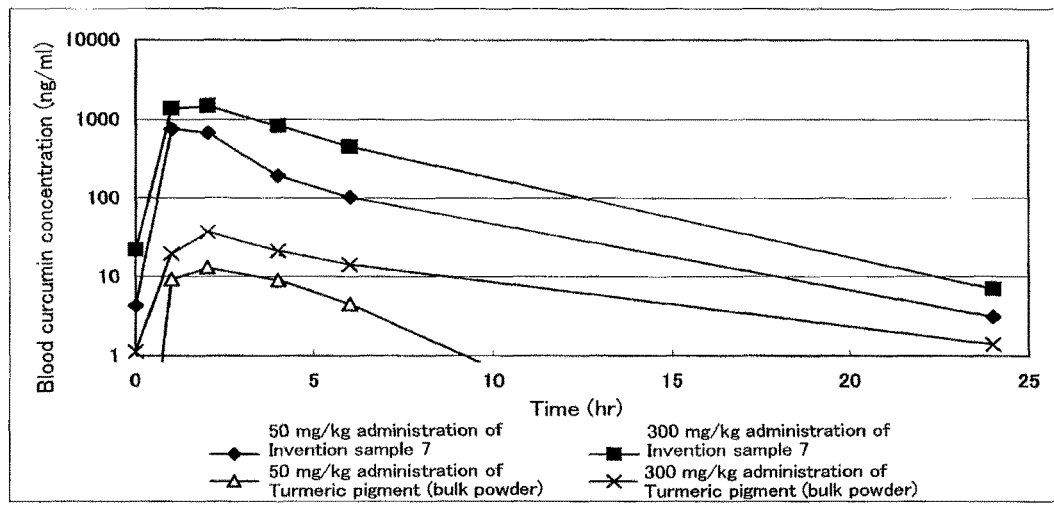
FIG. 4 A graph showing respective curcumin plasma concentrations (ng/mL) according to Experiment 5 upon 50 mg/kg administration of Invention Sample 7 of the present invention (solid rhombus), 300 mg/kg administration of Invention Sample 7 of the present invention (solid square), 50 mg/kg administration of turmeric pigment (bulk powder) (blank triangle), and 300 mg/kg administration of turmeric pigment (bulk powder) (cross), at each blood sampling (before administration; and 1, 2, 4, 6 and 24 hours after administration).

FIG. 4 shows curcumin plasma concentrations upon collection of blood samples. Table 10 shows maximum plasma concentration: $C_{max}$, time consumed to reach maximum plasma concentration: $T_{max}$, plasma concentration-area under the blood concentration time curve: AUC∞, which were found according to the graph of FIG. 4.

TABLE 10

| | Administration Amount | $C_{max}$ (ng/ml) | $T_{max}$ (hr) | AUC∞ (ng/mL · hr) |
|---|---|---|---|---|
| Invention | 50 mg/kg | 752 | 1 | 2670 |
| Sample 7 | 300 mg/kg | 1490 | 2 | 7570 |
| Turmeric | 50 mg/kg | 13 | 2 | 71.6 |
| Pigment (bulk powder) | 300 mg/kg | 37.4 | 2 | 243 |

The results show that the turmeric pigment composition of the present invention had a significantly increased absorbability into the body upon oral administration. In view of many superior pharmacological effects of turmeric pigments that have been revealed by recent studies, the turmeric pigment composition of the present invention is useful not only as a colorant, but also, by itself, as an oral composition; more specifically, as a food (functional food such as a dietary supplement).

(2) Evaluation of Absorbability of Turmeric Pigment Using Turmeric Pigment Powdered Composition The turmeric pigment powdered composition prepared in Example 24 was diluted with a 1.5% gum arabic aqueous solution, and the diluted solution was administered to a SD rat (male, 8 weeks old, raised with free access to food and water) by forced-oral administration in a curcumin administration amount of 300 mg (3 rats) per kilogram of body weight. As a control, a powdered turmeric pigment (curcumin powder No. 3705: San-Ei Gen F.F.I., Inc., average particle diameter (d50): 22.75 μm, crystalline form) was dispersed in a 1.5% gum arabic aqueous solution, and the solution was administrated to SD rats in the same curcumin amount (50 mg/Kg).

In the following, evaluation of absorbability of turmeric pigment using a turmeric pigment powdered composition was carried out by performing blood sample collection, measurement, and calculation according to the method of Experiment 5(1) using Invention Sample 7, which is a turmeric pigment liquid composition.

Figure 5:
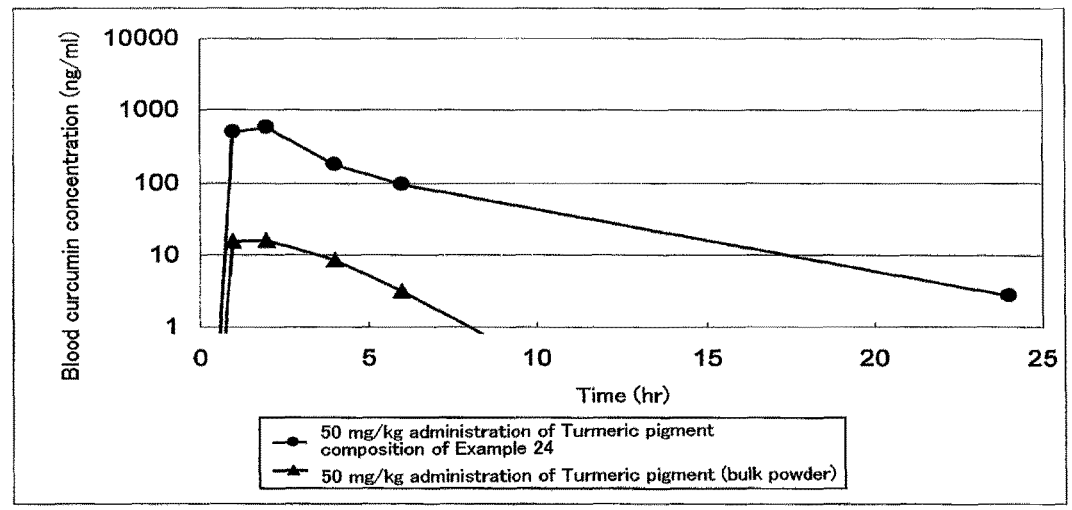
FIG. 5 A graph showing respective curcumin plasma concentrations (ng/mL) according to Experiment 5 upon 50 mg/kg administration of the pigment composition prepared in Example 24 (solid circle) and 50 mg/kg administration of a turmeric pigment (bulk powder) (solid triangle), at each blood sampling (before administration; and 1, 2, 4, 6 and 24 hours after administration).

FIG. 5 shows curcumin plasma concentrations upon collection of blood samples. Table 11 shows maximum plasma concentration: $C_{max}$, time consumed to reach maximum plasma concentration: $T_{max}$, and plasma concentration-area under the blood concentration time curve: AUC∞, which were found according to the graph of FIG. 5.

TABLE 11

| | Administration Amount | $C_{max}$ (ng/ml) | $T_{max}$ (hr) | AUC∞ (ng/mL · hr) |
|---|---|---|---|---|
| Turmeric Pigment Powdered Composition of Example 24 | 50 mg/kg | 584 | 2 | 2220 |

TABLE 11-continued

|  | Administration Amount | $C_{max}$ (ng/ml) | $T_{max}$ (hr) | AUC∞ (ng/mL · hr) |
|---|---|---|---|---|
| Turmeric Pigment (bulk powder) | 50 mg/kg | 15.9 | 2 | 63.1 |

The results show that the turmeric pigment powdered composition of the present invention also had significantly increased absorbability into the body upon oral administration, as in the liquid composition. Accordingly, the turmeric pigment composition of the present invention is useful as an oral composition such as a powder, granular or tablet composition; in particular, as a food (functional food such as a dietary supplement).

Experiment 6: Evaluation of Absorbability of Turmeric Pigment Using Turmeric Pigment Liquid Composition 300 mg (30 mg in curcumin content) and 1000 mg (100 mg in curcumin content) of the turmeric pigment powdered composition (Invention Sample 7) prepared in Experiment 1 were respectively diluted with 100 ml of water, and were orally taken by 7 healthy adults. As a control, 34 mg (30 mg in curcumin content) of a powdered turmeric pigment (curcumin powder No. 3705: San-Ei Gen F.F.I., Inc., average particle diameter (d50): 22.75 μm, in the form of crystal) was wrapped with an oblate (manufactured by Kowa Company, Ltd.,), and was orally taken by 7 healthy adults with 100 ml of water. Blood samples were collected before administration, 1 hour after administration, 2 hours after administration, 4 hours after administration, 6 hours after administration, and 24 hours after administration; and each sample was centrifuged for 10 minutes at 4° C. and 3500 rpm, thereby obtaining plasma.

Figure 6:
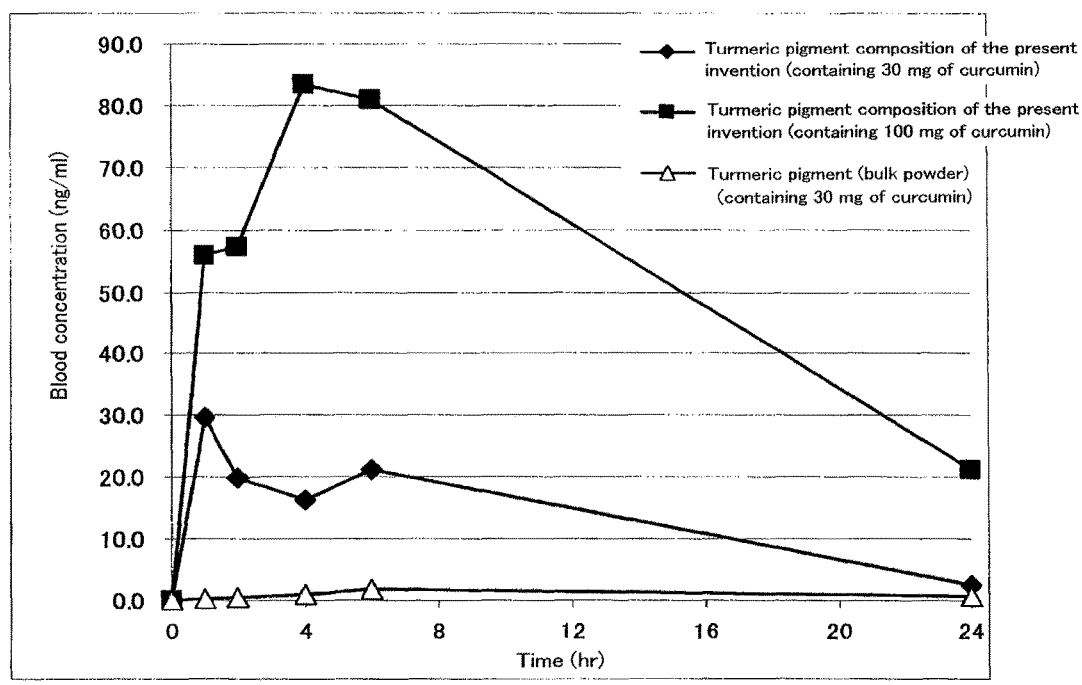
FIG. 6 A graph showing respective curcumin blood concentrations (ng/mL) over time according to Experiment 6 upon oral administration of a turmeric pigment composition (Invention Sample 7) of the present invention (containing 30 mg of curcumin (solid rhombus) and 100 mg of curcumin (solid square)), and oral administration of turmeric pigment (bulk powder) containing 30 mg of curcumin (blank triangle).

The curcumin plasma concentrations for the respective blood samples were measured according to the method of Experiment 5. FIG. 6 shows the results. Table 12 shows maximum plasma concentration: $C_{max}$, time consumed to reach maximum plasma concentration: $T_{max}$, and plasma concentration-area under the blood concentration time curve: AUC0-6 h, which were found according to the graph of FIG. 6.

TABLE 12

|  | Administration Amount of Curcumin | $C_{max}$ (ng/ml) | $T_{max}$ (hr) | AUC0-6h (ng/ml/hr) |
|---|---|---|---|---|
| Turmeric Pigment Powdered Composition (Invention Sample 7) | 100 mg | 83.30 | 4 | 389.22 |
|  | 30 mg | 29.52 | 1 | 113.04 |
| Powdered Turmeric Pigment (bulk powder) | 30 mg | 1.84 | 6 | 4.14 |

The results show that the absorbability of the turmeric pigment composition of the present invention into the body was significantly increased not only when the composition was administered to a small animal, such as a rat, but also when the composition was administered to a human. As described above, because turmeric pigments have many superior pharmacological effects, the turmeric pigment composition of the present invention is useful not only as a colorant, but also as an oral composition; more specifically, as a food (functional food such as a dietary supplement).

INDUSTRIAL APPLICABILITY

The present invention provides a turmeric pigment composition in which aggregation and sedimentation of a turmeric pigment over time is effectively prevented even when a concentrated amount of turmeric pigment is incorporated in a hydrous solvent; the turmeric pigment composition also ensures a desirable color-developing property, and is capable of stably adding a deep color with a bright tone, which was never accomplished by a hitherto-known colorant. The present invention also provides a preparation method of such a turmeric pigment composition. Further, the turmeric pigment composition of the present invention containing curcuminoid has a greatly improved absorbability into the body upon oral administration, compared with a hitherto-known curcuminoid.

The invention claimed is:

1. A turmeric pigment composition comprising gum ghatti and a turmeric pigment having an average particle diameter of 1 μm or below, wherein said turmeric pigment is dispersed in a hydrous solution of said gum ghatti wherein the concentration of gum ghatti is 1-10 mass %, wherein the content of gum ghatti is 10 to 200 parts by mass relative to 100 parts by mass of the turmeric pigment, wherein the concentration of turmeric is 5 to 20 mass %.

2. The turmeric pigment composition according to claim 1, wherein said gum ghatti is dissolved in a solvent comprising water, or mixed solvents of water and solvents compatible with water.

3. The turmeric pigment composition according to claim 1, wherein the turmeric pigment composition has a powdered, granular or tablet form that is prepared by a step of subjecting a turmeric pigment composition to dry powderization, the turmeric pigment composition having a liquid form and having gum ghatti, a turmeric pigment having an average particle diameter of 1 μm or below, and water.

4. A food or a cosmetic comprising the turmeric pigment composition according to claim 1.

5. The turmeric pigment composition according to claim 1,
wherein, when the turmeric pigment composition is placed in a 200 mL transparent glass vial, diluted with ion-exchanged water so that the final turmeric pigment content is 0.15 mass %, then hot-pack sterilized at 93° C., the relative change of the turbidity at 720 nm of the upper layer portion of the thus obtained composition is retained above 96.43% after storage for three days at 60° C.

6. The turmeric pigment composition according to claim 1,
wherein, when the turmeric pigment composition is placed in a 200 mL transparent glass vial, diluted with ion-exchanged water so that the final turmeric pigment content is 0.15 mass %, then hot-pack sterilized at 93° C., and stored for three days at 60° C., precipitates of turmeric pigment are only found to accumulate in about a two-thirds circumference in a circular concave portion of the vial.

* * * * *